(12) United States Patent
Liege

(10) Patent No.: US 8,429,625 B2
(45) Date of Patent: Apr. 23, 2013

(54) DIGITAL DATA PROCESSING METHOD AND SYSTEM

(75) Inventor: Bruno Liege, Boulogne (FR)

(73) Assignee: DXO Labs, Boulogne Billancourt (FR)

( * ) Notice: Subject to any disclaimer, the term of this patent is extended or adjusted under 35 U.S.C. 154(b) by 1258 days.

(21) Appl. No.: 12/097,893

(22) PCT Filed: Dec. 19, 2006

(86) PCT No.: PCT/FR2006/051389
§ 371 (c)(1),
(2), (4) Date: Sep. 12, 2008

(87) PCT Pub. No.: WO2007/071883
PCT Pub. Date: Jun. 28, 2007

(65) Prior Publication Data
US 2009/0228677 A1    Sep. 10, 2009

(30) Foreign Application Priority Data
Dec. 19, 2005   (FR) ..................... 05 53946

(51) Int. Cl.
*G06F 9/45* (2006.01)
(52) U.S. Cl.
USPC ........... 717/139; 717/136; 717/150; 717/151; 717/160
(58) Field of Classification Search ........................ None
See application file for complete search history.

(56) References Cited

U.S. PATENT DOCUMENTS

| | | | |
|---|---|---|---|
| 5,655,130 A * | 8/1997 | Dodge et al. ................. | 715/210 |
| 5,857,100 A * | 1/1999 | Phillips et al. ............... | 718/101 |
| 5,860,072 A * | 1/1999 | Schofield ...................... | 707/756 |
| 6,014,702 A * | 1/2000 | King et al. .................... | 709/227 |
| 6,115,713 A * | 9/2000 | Pascucci et al. .............. | 1/1 |
| 6,463,582 B1 * | 10/2002 | Lethin et al. ................. | 717/158 |
| 6,988,271 B2 * | 1/2006 | Hunt .............................. | 719/315 |
| 7,191,404 B2 * | 3/2007 | Barker et al. ................. | 715/760 |
| 7,343,040 B2 | 3/2008 | Chanas et al. | |
| 7,346,221 B2 | 3/2008 | Chanas et al. | |
| 7,356,198 B2 | 4/2008 | Chauville et al. | |
| 7,493,630 B2 * | 2/2009 | Hunt .............................. | 719/330 |
| 7,627,594 B2 * | 12/2009 | Meijer et al. ................. | 1/1 |
| 7,870,295 B2 * | 1/2011 | Johnson ........................ | 709/246 |
| 7,987,455 B1 * | 7/2011 | Senner et al. ................ | 717/136 |

(Continued)

FOREIGN PATENT DOCUMENTS

WO     WO 99/52040     10/1999

OTHER PUBLICATIONS

David F. Bacon, et al., "Compiler Transformations for High-Performance Computing", ACM Computing Surveys, XP002246513, vol. 26, No. 4, Dec. 1994, pp. 345-420.

(Continued)

*Primary Examiner* — Chameli Das
(74) *Attorney, Agent, or Firm* — Oblon, Spivak, McClelland, Maier & Neustadt, L.L.P.

(57) ABSTRACT

A method and system for processing generic formatted data, including first data describing a sequence of generic operations without any loops, in view of providing specific formatted data, for a determined platform including Q processor(s) and at least one memory, the platform configured to process, according, directly or indirectly, to specific formatted data, an object made up of elementary information of same type, each elementary information being represented by at least one numerical value.

20 Claims, 5 Drawing Sheets

U.S. PATENT DOCUMENTS

| | | | |
|---|---|---|---|
| 8,117,587 B1* | 2/2012 | Testardi | 717/100 |
| 2002/0112227 A1* | 8/2002 | Kramskoy et al. | 717/148 |
| 2002/0147969 A1* | 10/2002 | Lethin et al. | 717/138 |
| 2004/0098141 A1* | 5/2004 | Martin | 700/18 |
| 2004/0187090 A1* | 9/2004 | Meacham | 717/103 |
| 2004/0218071 A1 | 11/2004 | Chauville et al. | |
| 2004/0234152 A1 | 11/2004 | Liege et al. | |
| 2004/0240750 A1 | 12/2004 | Chauville et al. | |
| 2004/0252906 A1 | 12/2004 | Liege et al. | |
| 2005/0002586 A1 | 1/2005 | Liege et al. | |
| 2005/0008242 A1 | 1/2005 | Liege et al. | |
| 2007/0094646 A1* | 4/2007 | Higham | 717/136 |
| 2007/0198971 A1* | 8/2007 | Dasu et al. | 717/140 |

OTHER PUBLICATIONS

Thierry Grandpierre, et al., "From Algorithm and Architecture Specifications to Automatic Generation of Distributed Real-Time Executives: a Seamless Flow of Graphs Transformations", Formal Methods and Models for Co-Design, XP010643808, Jun. 24, 2003,10 pages.

Zbigniew Chamski, et al., "The SANDRA Project: Cooperative Architecture/Compiler Technology for Embedded Real-Time Streaming Applications", INRIA Rocquencourt, XP002380285NO. 4773, Mar. 2003, pages (with English abstract).

Gilles Kahn, "The Semantics of a Simple Language for Parallel Programming", Information Processing , Proceedings of IFIP Congress, XP001179529, vol. Proc., 1974 , pp. 471-475.

M. Raulet, et al., "Automatic Coarse-Grain Partitioning and Automatic Code Generation for Heterogeneous Architectures", Signal Processing Systems, XP010661035, Aug. 27, 2003, pp. 316-321.

Alain Darte, et al., "Generalized Multi Partitioning of Multi-dimensional Arrays for Parallelizing Line-Sweep Computations", Journal of Parallel and Distributed Computing, XP004459910 vol. 63, No. 9, Sep. 2003, pp. 887-911.

Caroline Aiglon, et al., "Utilisation de SynDEx Pour le Traitement D'images Tmps-rèel", Rapport De Recherche INRIA, XP002409017, Sep. 1996, pp. 1-79 (with English abstract).

Siegfried Benkner, et al., "Processing Array Statements and Procedure Interfaces in the PREPARE High Performance Fortran Compiler", Compiler Construction, XP001248203, 1994, pp. 324-338.

* cited by examiner

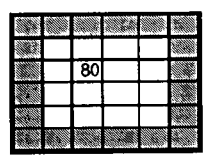
Figure 1a   Figure 1b   Figure 1c   Figure 1d
Figure 1e   Figure 1f
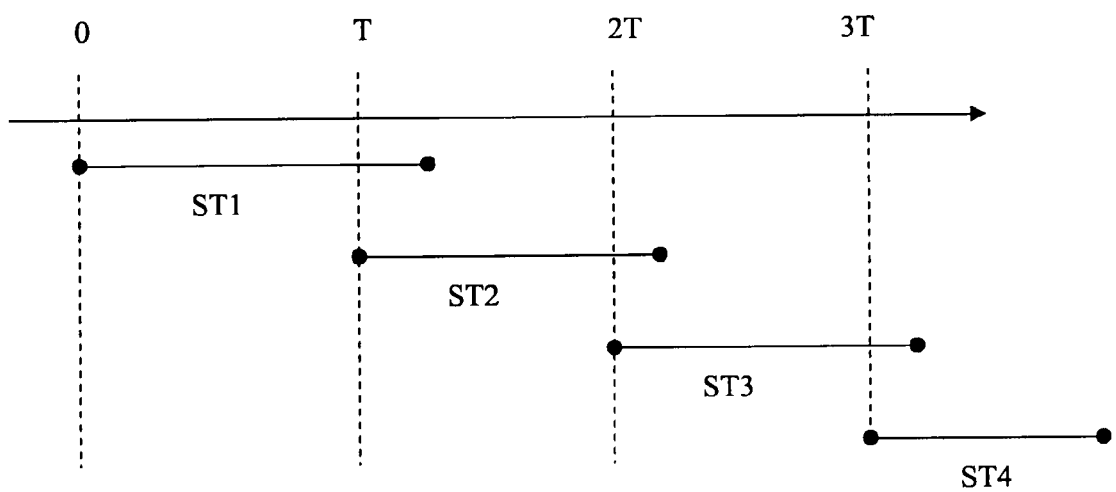
Figure 2

DIGITAL DATA PROCESSING METHOD AND SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Technical Field

The present invention relates to a method and a system for processing generic formatted data in view of providing specific formatted data to a processing platform. The specific formatted data can be provided directly or indirectly using a compiler to generate a binary code adapted to the platform using specific formatted data.

2. Background Art

Currently, object processing algorithms are generally written in a known language, such as C, assembly or VHDL language, and are then compiled or translated into binary before being used by a platform destined to carry out the processing operation.

The compilers used are compilers that are specific to a type of language.

In the example of a compiler C, which is one of the most standard compilers, the code in C is translated to be understood, for example, by a personal computer of PC or MAC type. This compilation depends on the platform for which the algorithm is compiled. Given that the processors of these two platforms have similar characteristics, processing algorithms can be written to be compatible with both platforms.

Furthermore, in an algorithm coded in C, the programmer must define, right from the start, different sections of the code dependent on the platform such as the decomposition of the object into sub-objects, the loops, the processing order for elementary information and sub-objects, the organisation of data in memory, notably to permit access to data of different positions and to permit the change of scale, the exchange of data between memories and the management of edges.

Given that these sections of the code dependent on the platform are determined a priori by a programmer, according to the platform and to the algorithm, they must be optimised "manually" for each algorithm+platform combination. Furthermore, since they are defined explicitly, and mixed with the code describing the algorithm itself, it is very difficult for the compiler to disregard these sections of the code dependent on the platform to adapt them manually to another platform.

BRIEF SUMMARY OF THE INVENTION

For example, in the case of a signal processing processor with a small local memory, wherein data has to be copied from and to the main memory from this local memory, this copy must be added manually and deeply compromises the structure of the loops and data in memory. For another example, a vector signal processor, notably of SIMD (Single Instruction Multiple Data) type must process data grouped into vectors of different sizes according to the platform and, since the vectors cannot be expressed independently from the platform when a language such as language C is used, an assembler must be coded in a manner that is dependent on the platform.

Furthermore, when an algorithm is modified, notably in terms of access to data at diverse positions, this compromises, at least partially, the different parts of the code dependent on the platform.

It is therefore very difficult to optimise the size of the code, the size of the memory and the quantity of instructions required, without spending a considerable amount of time optimising each algorithm+platform combination. Indeed, each platform has its own characteristics, both in terms of equipment (for example, the quantity and type of processors, or size and type of memory) and in terms of language used (C for a scalar processor and assembly language for a vector signal processor).

To solve this problem, conventionally the use of low-level libraries capable of carrying out diverse processing operations on physical blocks, such as convolutions, multiplications, or even the application of correlation tables, is known. This only allows once-only optimisation of these libraries for each platform. Nevertheless, there are many disadvantages to this method:

the size of libraries, and therefore the size of the code, is significant, given the library call times, physical blocks of a relatively significant size need to be used, which results in significant memory use, given that the internal loops on the elementary information are located inside the libraries, sequences of operations cannot be optimised, which results in limited performance, the physical blocks are stored in memory, which results in intensive memory use and much time spent writing and reading intermediary data from the memory, and these libraries are optimised for a limited number of platforms, often by a processor manufacturer and are not available therefore for all platform types.

The subject of the invention is therefore to propose a data processing method wherein automatic optimisation is possible for several platforms, with a high speed of execution, a low use in memory and a low size of code, all object processing algorithms made up of a large quantity of different elementary information, coded in a language adapted to this type of algorithm. The invention allows notably the acceleration of the market release of equipment and software for processing data, notably images, by obtaining an optimised implementation automatically and quickly for diverse platforms of any algorithm, and by permitting algorithm modification as late on as possible. In the case of an image capturing device, for example, this belated modification allows it to adapt quickly to a new sensor, the characteristics of which, notably noise-related, which increases with miniaturization, evolve very fast.

The invention relates to a method for processing generic formatted data, wherein first data describes a sequence of generic operations without any loops, in view of providing, directly or indirectly, specific formatted data, for a determined platform comprising Q processor(s) and at least one memory, wherein said platform is destined to process, according to specific formatted data, an object made up of elementary information of same type, each elementary information being represented by at least one numerical value.

The method comprises the following steps:
  the step of translating the sequence of generic operations into specific operations, according to the platform,
  the step of determining the set of loops required for processing, according to the object's topology, and independently from the first data,
  the step of calculating specific formatted data including the sequence of specific operations and the loops thus determined, and permitting, directly or indirectly, the processing of the object, conform with generic formatted data, wherein the sequence is optimised for the platform in terms of size of code and/or size of memory, and/or calculation time.

The specific formatted data includes the sequence of specific operations thus determined.

Conventionally, using a compiler to translate operation sequences that involve loops and tables is known:
  wherein the translation uses a graph that describes the link between the operations inside of one same loop iteration and inside of one loop iteration to the other, particularly the dependencies on the indexes of access to one of the table's elements.
  the translation including optimisations which modify the pre-existing loops
  the translation including the step of modifying the organisation of tables and/or modifying the operations using the tables, in order to adapt to the platform's characteristics The characteristics of the sequence of generic operations used (type of first and second data) enables
  dismissal of the dependency of loops with the operations and with the graph of operations.
  the sequence of generic operations used neither employs tables nor index of access to a table element, and in particular the method or system according to the invention does not include the step of modifying the organisation of tables and/or modifying the operations using the tables.

The invention thus permits direct generation, without requiring specific optimisation of loops for each sequence of operations, or the use of graphs, of an optimal code which uses the Q processors at 100%. This characteristic is particularly difficult to obtain. The invention permits reaching 100% by means of:
  the organisation of loops independent from first data
  the organisation of data in memory which is not in the form of tables but, for example, in the form of queues as described hereafter
  the use of chaining including calculation units and a queue, as described hereafter
  for example, the document "Compiler transformations for high performance computing" "ACM Computing Surveys, New York, N.Y. US, vol 26, no. 4, December 1994" specifies that the utilisation ratio of processors given by the formula U=F/ST is distinctly lower than 100% (p351), the rate of 100% being considered as ideal; the method and system according to the invention enable reaching 100% for any type of algorithm for processing objects composed of information of the same type;

The invention also permits a significant reduction in the use of memory, by permitting the processing of the elementary information according to a scrolling mode adapted to process data one sub-object at a time, whatever the size of the sub-object, thus avoiding storing, in the case of an image, a large quantity of lines before starting processing operations on a block.

An example of translation of the sequence of generic operations into a sequence of specific operations will now be described. In this example:
  the objects are images in two monochromatic horizontal and vertical dimensions, the elementary information being represented by one single numerical value
  the sequence of generic operations is as follows:
    apply a 3*1 vertical F1 filter followed by a 1*3 horizontal F2 filter
  the specific operation sequence is translated into the following specific operation sequence:
    store a sub-object obtained from an input queue in R1
    calculate F1.C1*R1 and store the result in R2
    carry out UP(R1) and store the result in R1
    calculate F1.C2*R1 and store the result in R2
    carry out UP(R1) and store the result in R1
    calculate F1.C3*R1 and store the result in R2
    calculate F2.C1*R2 and store the result in R3
    carry out LEFT(R2) and store the result in R2
    calculate F2.C2*R2 and store the result in R3
    carry out LEFT(R2) and store the result in R2
    calculate F2.C3*R2 and store the result in R3
  R1, R2 and R3 are registers each used to store N elementary information for a sub-object or the Ns resulting from one same specific operation during the processing of one same sub-object
  wherein F1.C1, F1.C2 and F1.C3 are parameters corresponding to the factors for filter F1
  wherein F2.C1, F2.C2 and F2.C3 are parameters corresponding to the factors for filter F2
  LEFT(R1) can be implemented by using chaining according to the horizontal dimension including a Queue H queue as described further below; for example:
    If the sub objects are made up of 4 pixels disposed horizontally and a register contains 4 data from left to right R1.1, R1.2, R1.3 and R1.4: LEFT(R1) means write R1.4 in QueueH, write R1.3 in R1.4, write R1.2 in R1.3, write R1.1 in R1.3, for the first sub-object of a line R1.1 is unchanged otherwise R1.1 receives data read in QueueH
  UP(R2) can be implemented using chaining according to the vertical dimension including a QueueV queue as described further below
    If the sub-objects are made up of 4 pixels disposed horizontally and a register contains 4 data from left to right R1.1, R1.2, R1.3 and R1.4: UP(R1) means R1.4 in QueueV, write R1.3 in R1.4, write R1.2 in R1.3, write R1.1 in R1.3, for the objects of the first line of the image R1.1 is unchanged otherwise R1.1 receives data read in QueueV In the example, the translation of the sequence of generic operations into a sequence of specific operations is independent from the scrolling mode as defined hereafter. A scrolling mode (24) can then be determined for elementary information in the platform, according to the architecture of this platform (22) and according to the topology of the object and independently from first data, the determination of this scrolling mode including the choice and/or calculation:
  of a grouping of elementary information into sub-objects, each including a quantity N of elementary information, determined according to the platform, the processing in the platform consisting in launching periodically a sub-processing operation, which consists in applying the sequence of specific operations to one of the sub-objects, of the form and overlay of the sub-objects, determined according to the platform, of the processing order for sub-objects, determined according to the platform.

Preferably, determining the set of loops means determining the scope of each loop, the embedding of the set of loops, the iteration quantity being determined according to the object. For example, in the case of an image with two horizontal and vertical dimensions, in the case where Q=4 and in the case where the 4 processors process 4 contiguous pixels from one same line, the following loops can be determined:

for each line from top to bottom
for each group of 4 pixels from left to right
perform the sequence of specific operations on the group of 4 pixels by performing the same specific operation simultaneously on the 4 processors In this example, the iteration quantity depends on the size of the image. However, the set of loops required for the processing operation has been determined according to the platform's architecture and according to the object's topology, and independently of first data. For example, the loops can be used for any one of the following sequences of generic operations:

apply a 3*1 vertical F1 filter followed by a 1*3 horizontal F2 filter
add the constant 3 to the elementary information
or any other sequence of generic operations According to the invention, a loop can be, without the list being restrictive, notably: a loop executed a certain number of times, a loop that is executed provided that a condition is verified, a loop that is executed until a condition is verified, generally an iterative execution linked to one or more output conditions for the loop.

The notion of queue, according to the invention, will now be defined.

A queue is used to transmit and/or store elementary information or results from specific operations.

A queue can comprise or use a memory.

A queue can be implemented using one or more processes of FIFO (First in first out) type.

A queue comprises at least one input and at least one output.

A queue can be connected operationally via any means to an input calculation unit and to an output calculation unit.

A queue can also be connected operationally via any means to PR input calculation units and PR output calculation units, in this case the queue behaves like PR queues each linking an input calculation unit to an output calculation unit.

Preferably, a queue can be used to manage several data fluxes independently, each flux being associated to a determined specific operation.

In one embodiment, it is possible to read and write simultaneously in a queue.

Preferably a queue uses at least one memory unit to store, for each flux, an identical quantity NF of data.

Preferably NF is determined according to the relative disposition of the sub-objects and to the scrolling mode, such that NF-1 sub-objects be processed between the processing of a sub-object producing data and the processing of the sub-object using the same data.

Preferably, a chaining comprising calculation units and a queue, includes a mechanism enabling management of the booting operation: the queue is initialised in a regular manner, for example at the beginning of each line if the queue is part of a horizontal chaining and the object is an image; provided that the queue does not comprise NF data, the processor following the queue in the chaining, takes as input the data that it sends in output; next, the processor following the queue in the chaining takes the oldest data in the queue in input and removes it from the queue.

Preferably the queue enables outputting data in the same order as they have been input in the queue.

Preferably, the cyclic chaining is unidirectional. Preferably, the cyclic chaining is such that there is one single link in input and one single link in output per calculation unit.

The use of at least one queue thus enables the transmission of results from specific operations required in the calculation of at least one other sub-object.

In the present description, generic formatted data is digital data used for describing a processing operation to be performed on an object by a data processing platform, independently of the platform itself. In the present invention, the processed objects correspond to a set of elementary information of same type; these objects are, for example, images, digital audio, video or even simulation data.

In one embodiment, the generic formatted data comprises second data referring to the relative position, according to at least one of the object's dimensions, notably spatial and/or temporal, of the blocks and/or parameters in relation to each other, and/or referring to the relative scale, according to at least one of the object's dimensions, notably spatial and/or temporal, of the logical blocks and/or of the parameters in relation to each other.

In one embodiment, the objects and sub-objects, as well as the logical blocks, have several dimensions.

The dimensions of the sub-objects and the logical blocks correspond to all or a part of the object's dimensions.

The dimensions can be of different types, notably:
spatial, for example a distance, an angle or a scrolling in a mesh,
temporal,
frequency, for example a colour, a frequency, a frequency band
a phase,
a decomposition according to a vector space base, for example a decomposition into wavelets, or a decomposition into high bytes and low bytes
generally, the dimensions of any space of any topology.

The following non-exhaustive list provides examples of objects with their dimensions:
a still image with 2 dimensions, each corresponding to distances, notably measured in pixels,
an unprocessed still image with 2 dimensions, each corresponding to distances, each pixel being equipped with a colour, for example red, green or blue,
a still colour image, with 2 dimensions, each corresponding to distances, and one dimension corresponding to a frequency representing the colour channel, for example red/green/blue,
a moving image with 3 dimensions, 2 of which correspond to distances, notably measured in pixels, and one of which corresponds to time,
an image in relief with 3 dimensions, corresponding to distances,
an image in relief with 3 dimensions, 2 of which correspond to distances, and the third corresponding to a viewing angle,
a medical image with distance dimensions and possibly channel dimensions,
a hologram with viewing angle dimensions,
more generally, an image with distance and/or angle and/or temporal, and/or frequency dimensions,
a sound with a dimension corresponding to time, a sound with 2 dimensions corresponding to time and to a channel, a modulated signal with one or more dimensions corresponding to time and, possibly, a frequency and, possibly, a position in space or an angle, signal modulation and demodulation, measurement, analysis of data, database indexing or searching, viewing by computer, graphic processing, simulation in the form of elementary information disposed according to one or more dimensions, more generally, an object with one or more dimensions.

In the present invention, an object's elementary information can have an absolute position and/or scale, notably spatial and/or temporal and/or frequency, but equally according to at least one of the object's dimensions as well as in any other space, notably a space made up of wavelets:

an elementary information for an "audio" object can correspond to an intensity; in this case, the elementary information has an absolute position corresponding to a given moment in time and, in the case of a multi-channel sound, to a given channel.

an elementary information for an "image" object can correspond to a pixel; in this case, the elementary information has an absolute position corresponding to a position in the image and, in the case of a video image, to a given moment in time.

an elementary information for a "data simulation" object can correspond to a status; in this case the elementary information has an absolute position corresponding to a meshing node and to a given moment in time.

an elementary information for a "modulated signal" object can correspond to an intensity and/or a phase; in this case, the elementary information has an absolute position corresponding to a given point in time and, possibly, to a given frequency and/or to a given position, if several antennae or transmitters are used.

An elementary information is an element of information to be processed, represented by one or more numerical values. This information can be coded according to diverse types of coding such as 8 bit coding, 10 bit coding, or even 16 bit signed coding. In the case where the object is an image, for example, the elementary information will be the pixels of this image.

The objects can be unprocessed images (of "raw" type) before demosaicing operation, in which case:

in one alternative, an elementary information is a pixel represented by a numerical value corresponding, according to the absolute position of the pixel, for example to red, green or blue in another alternative, an elementary information is a group of pixels (for example a group of 2*2 green, red and blue pixels, green corresponding to a "Bayer") represented by one numerical value per pixel.

The objects can also be visible images, in which case an elementary information is a pixel represented, for example, by three numerical values, each representing a colour, for example red, green and blue.

The objects can also be sequences of images, notably unprocessed or visible, in which case an elementary information is a pixel of an image from the sequence of images. The objects therefore correspond to videos, for example.

In the case where the object is an image, the image can be received from an image capturing device and/or destined to an image rendering device:

An image capturing device is, for example, a disposable camera, a digital camera, a reflex camera (digital or not digital), a scanner, a fax, an endoscope, a video-camera, a camcorder, a surveillance camera, a toy, a video camera or a camera integrated or linked to a telephone, to a personal assistant or to a computer, a thermal camera, an ultrasound machine, a MRI (magnetic resonance) imaging unit, an X-ray radiography unit.

An image rendering device is, for example, a screen, a projector, a television, virtual reality goggles, or a printer.

An image capturing and image rendering device is, for example, a scanner/fax/printer, a compact photograph printing lab, a videoconferencing device.

The processing platform can take different forms, depending on the application. For example, in the case where the object is an image, the case will be cited notably where the processing platform is integrated into one of the following devices:

An image capturing device which produces processed images, for example a digital camera which integrates a processing platform.

An image rendering device which displays or prints processed images, for example a video projector or a printer including a processing platform.

A mixed device which corrects faults on these elements, for example a scanner/printer/fax including a processing platform.

A professional image capturing device which produces processed images, for example an endoscope including a processing platform.

The processing platform can be fully or partially deported on a server.

Processing, which will be applied to the object in the platform, corresponds to an algorithm, described by one or more sequences of generic operations, which can intervene in diverse fields such as, for example, image processing, data compression and decompression, audio processing, signal modulation and demodulation, measurement, data analysis, database indexing or searching, viewing by computer, graphic processing, simulation or any field involving a high quantity of data. Generic operations are operations which apply to logical blocks, i.e. to abstract entities, without notion of size, nor form, nor time.

Generic operations can produce logical blocks. Preferably, at least one logical block corresponds to the object to be processed.

Furthermore, in one embodiment, the method comprises, the step of determining a scrolling mode for elementary information in the platform and according to the topology of the object and independently from the first data, the determination of this scrolling mode including the choice and/or calculation:

of a group of elementary information in sub-objects, each including a quantity N of elementary information, determined according to the platform, and the processing in the platform consisting in launching periodically a sub-processing operation, which consists in applying the sequence of specific operations to a sub-object, of the form and overlay of the sub-objects, determined according to the platform, of the processing order for sub-objects, determined according to the platform, The steps, described above, which consist in determining the set of loops necessary for the processing and/or in calculating the specific operation sequences, account for this scrolling mode.

For example, in the case of an image with two horizontal and vertical dimensions, in the case where the platform's architecture is as follows: Q=4 and in the 4 processors that can process 4 contiguous pixels of one same line, the following scrolling mode can be determined:
- group the elementary information into sub-objects of 4 contiguous pixels from one same line, wherein the sub-objects are not overlaid,
- process the sub-objects in the following order: line by line from top to bottom and within a line from left to right
- determine the corresponding loops
  - for each line from top to bottom
    - for each group of 4 pixels from left to right
      - perform the sequence of specific operations on the group of 4 pixels by performing the same specific operation simultaneously on the 4 processors In this example, the scrolling mode has been determined according to the platform's architecture and according to the object's topology, and independently of first data. For example, the scrolling mode is compatible with any one of the following sequences of generic operations:
- apply a 3*1 vertical F1 filter followed by a 1*3 horizontal F2 filter
- add the constant 3 to the elementary information
- or any other sequence of generic operations.

Preferably, the processing of each sub-object is distributed across the Q processors, which each perform at least one specific operation IS8 from the specific operations sequence. Thus, all processors are used for each sub-object and one single processor is used for the set of sub-objects. The sub-objects do not therefore need to be assigned to the processors.

Preferably, when a specific operation is performed by a processor to process a sub-object, the same specific operation is also performed by the same processor for processing all the other sub-objects. The processing is therefore regular: the specific operations are assigned to the processors and then performed periodically for each sub-object sub-processing operation.

Preferably, the set of loops necessary for the processing depend on the topology of the object and on the platform, but are independent from the sequence of specific operations.

Preferably, the loops are embedded into each other around the full sequence of specific operations. In this manner, the loops encapsulate the whole of the sequence of specific operations and the sequence of specific operations is not divided into sub-sequences each surrounded by loops. In the same manner, the object can be processed by processing a sub-object at the same time without it being necessary to store the full object or to store the set of results for a specific operation, but only by storing, temporarily, the results which are necessary for the processing of another sub-object. Such that the memory use is reduced.

Preferably, the sub-objects are made up of contiguous elementary information. It is therefore possible to implement chainings of processors comprising at least one queue.

In one embodiment, to process a sub-object of N elementary information, each specific operation for the sequence is carried out N times in total and N/Q times for each Q processor. In the case where the sequence of specific operations includes conditional connections, each processor performs the part of the sequence, accounting for these conditional connections.

In one embodiment, the sub-objects are not overlaid according to at least one dimension. Such that, at least one specific operation result produced during the processing of a sub-object is used during the processing of another sub-object.

Preferably, the sub-objects are not overlaid according to any dimension. Such that each processor can be used at 100% without repeating the calculation.

Preferably, the sequence of specific operations is such that at least one specific operation k of the sequence produces at least once during its N applications, a result used for processing another sub-object.

Preferably, in the case where there are several cyclic chainings according to one same dimension of the sub-object (notably when the processors are disposed according to a grid), the queue is shared between all the cyclic chainings according to the same dimension. Preferably, there is exactly one queue for each of the sub-object's dimensions, and each queue is shared between all the cyclic chainings according to the same dimension. Such that the communication between the processors is particularly simple. Such that the organisation of the memory is particularly simple.

According to the invention, launching a sub-processing operation periodically does not necessarily mean at exactly regular intervals, the synchronisation of data required for calculations and access to the memory being liable to vary the period.

In one embodiment, N is not a multiple of Q. In one alternative of this embodiment, Q is equal to the quantity of specific operations of the sequence obtained by translating the sequence of generic operations.

In one embodiment N is a multiple of Q. This renders the processing regular. Preferably N=Q. This reduces the quantity of memory required for storing temporary results.

In one embodiment Q=1 and N=4. This permits re-using a same parameter value for several applications of one same specific operation.

In one embodiment Q>1 and N=Q. This enables the use of Q calculation units of a vector signal processor at 100%.

In one embodiment Q>1 and N is a multiple of Q. This enables the use of Q calculation units of a vector signal processor at 100%, reducing the quantity of results from specific operations performed during the processing of a sub-object and used for processing another sub-object.

The memory slot in which the data is stored depends, for example, on the time when this data will be re-used. Thus, the data can be stored in registers, in a quick-access memory, or even in a slow memory.

In one embodiment, the determination of the scrolling mode includes the step of determining which specific(s) operation(s) of the sequence of specific operations is(are) performed by each processor, each operation being applied at least N times on each sub-object, each specific operation applying, directly and/or indirectly, at least once each, a sub-object's elementary information during its N applications and producing exactly N results. Furthermore, the method includes the step of adding the information thus determined to the specific formatted data.

In one embodiment, each processor performs all operations of the sequence of specific operations.

The sub-processing operations being launched periodically, preferably the specific operations performed by a given processor are the same for each period.

In one embodiment, the determination of the scrolling mode includes the step of determining, at each of the period's relative times, which specific operation(s) from the sequence of specific operations is(are) performed by each processor, each operation being applied at least N times on each sub-object, each specific operation applying, directly and/or indirectly, at least once each, a sub-object's elementary information during its N applications and producing exactly N results. Furthermore, the method includes the step of adding the information thus determined to the specific formatted data. In one embodiment, all the processors perform the same specific operation at the same time. In another embodiment, all the processors perform the same specific operation successively, which enables carrying out recursive filters.

In a further embodiment, the sequence of specific operations is such that at least two specific operations distinct from the sequence each produce at least once during their N applications, a result used for processing another sub-object.

The method also comprises the step of calculating specific formatted data according to specific operations and to the determined scrolling method.

The notion of relative scale and of relative position of two logical blocks permits notably, without the list being restrictive:
combination of several logical blocks, and/or
change of scale,
and/or creation of filters on neighbourhoods,
and/or change of representation.

In the present invention, the logical blocks are of several types according to the generic operation, for example, in the case where the object is an image,
at least one logical block is of "unprocessed" type, and/or
at least one logical block is of red type, and/or
at least one logical block is of green type, and/or
at least one logical block is of blue type, and/or
at least one logical block can be represented by 8 bit data, and/or
at least one logical block can be represented by 16 bit data.
at least one logical block can be represented by data on n bits, for example 10 or 12.

In one embodiment, at least one logical block contains multi-scale data, for example data at scale 1, ½, ¼ and ⅛. This makes it possible to carry out generic operations at several scales, and subsequently to combine the results An algorithm can correspond, for example, without this list being restrictive, in the case where the object is an image, to:
a calculation, notably statistic-based, for automatic white balance, and/or
a calculation, notably statistic-based, for automatic exposure, and/or
a calculation, notably statistic-based, for automatic focusing, and/or
a calculation, notably statistic-based, for automatic contrast improvement, and/or
a conversion of unprocessed image into visible image ("image pipe" or "Image Signal Processing (ISP)"), and/or
a correction of optic faults, and/or
an improvement in depth of field, and/or
a processing operation as described in patent request PCT/FR2006/050022 "Method for creating an image capturing and/or rendering device, and device obtained by this method" and in patent request PCT/FR2006/050197 for "Method for commanding an action, notably a modification of sharpness, using a digital colour image, and/or
a correction of sensor faults, and/or
a correction of imager faults, and/or
a processing operation, notably improvement of sharpness, and/or
a processing operation, notably improvement of colour rendition, and/or
a processing operation, notably improvement of contrast rendition, and/or,
a processing operation, notably improvement of detail rendition, and/or a noise reduction, and/or
a measurement, and/or
a compression, and/or
a decompression, and/or
an interpolation or enlargement (zoom), and/or
a scan, and/or
a special effect.

The object to be processed is generally, during the processing, decomposed into sub-objects, i.e. into groups of elementary information with a determined size and form, both in space and in time or in the object's other dimensions.

The sub-objects are sets of elementary information having a form and a size which, depending on the case, depend on the platform's characteristics, notably in terms of size and type of memory as well as, in the case of a vector signal processor, in terms of the size of a vector, but also the characteristics of the object to be processed.

Different possible types of decomposition into sub-objects, without overlay, are illustrated by FIGS. 1a to 1d. In these figures, it is shown that one same image can be divided into lines (lines 90, 91, 92 and 93 in FIG. 1a), into columns (columns 94, 95, 96 and 97 in FIG. 1b), into sub-objects of any other form (forms 70, 71, 72 and 73 in FIG. 1c), or even into rectangles (forms 60, 61, 62, 63, 64, 65, 66 and 67 in FIG. 1d).

In the case where the sub-objects are without overlay, elementary information for one minus another sub-object need to be accessed to process a sub-object's elementary information without losing edge, for example during the calculation of filters.

The decomposition into sub-objects can also depend on second data, notably total relative displacement data in order, for example, to determine the overlay required according to one dimension.

Furthermore, in one alternative, when some of the generic operations have non null displacements, so that no elementary information be lost during the execution of the algorithm, the image is decomposed into sub-objects having a non-null overlay according to at least one dimension.

This configuration is illustrated in FIGS. 1e and 1f: FIG. 1e shows a sub-object comprising 6×6 elementary information in the case where the sequence of operations loses a pixel on each edge, and FIG. 1f shows an object comprising 100 elementary information.

In this figure, it is shown that the sub-objects are four rectangles 80, 82, 83 and 84, each containing 36 elementary information. The rectangle 80 is made up of 36 elementary information located top left in the image, and the rectangle 82 is made up of 36 elementary information located top right in the image. Thus, the 8 elementary information 86 are common to both sub-objects 80 and 82.

Furthermore, the 8 elementary information 85 are common to the two sub-objects 80 and 83; the 8 elementary information 88 are common to the two sub-objects 82 and 84, and the 8 elementary information 89 are common to the two sub-objects 83 and 84. Lastly, the 4 elementary information 87 are common to the four sub-objects 80, 82, 83 and 84.

In the case where the object is an image, in one embodiment the image is decomposed into juxtaposed rectangular sub-objects, the sub-objects being destined to be processed, for example, from left to right then from top to bottom.

Depending on the platform, the sub-objects are selected and stored according to one of the following manners, without the list being restrictive:

- in the case of a signal processing processor, with a small quick-access memory and a large slow memory, the size of the sub-objects is chosen to be able to process a sub-object without accessing the slow memory; it would be possible, for example, to take sub-objects corresponding to squares of 32×32 pixels, the result of the calculation on the previous sub-object being transferred to slow memory during the calculation relative to the current sub-object, and during the transfer from the slow memory to the quick-access memory of data required for the calculation relative to the following sub-object, In the case where the object is of a different type to an image, the decomposition into sub-objects can be adapted in a similar way to the platform.

In languages such as C, this decomposition into sub-objects and the coding of corresponding loops must be explicit according to the platform, and performed manually for each platform. Vector signal compilers exist that endeavour to extract the sub-objects explicitly from coded loops, but their efficiency is limited, since they have to extract the algorithm concept before coding it automatically, which is very difficult. The invention thus enables automation and increased efficiency of the adaptation to any platform.

The following table summarises the main differences between the invention and known languages:

|  | Invention | Known languages | Example of C |
|---|---|---|---|
| Sequence of operations | Coded manually | Coded manually | Coded manually |
| Relative displacement and Relative scale | Automatic and optimised coding (loops, memory access . . . ) | Necessitates manual coding of loops and memory access | Necessitates manual coding of loops and memory access |
| Loops | Automatic and optimised coding according to the platform, no loops in the sequence | Manual coding, the compiler can load the order accounting for dependencies between the operations | Manual coding, the compiler can load the order accounting for dependencies between the operations |
| Organisation of data in memory | Automatic and optimised coding according to the platform, no information on the organisation of stored data in the sequence | Automatic and slow in some cases (Java) | Manual coding, the compiler can change the organisation accounting for dependencies between the operations |
| Management of edges | Automatic and optimised coding | Necessitates manual coding | Necessitates manual coding |
| Slow memory to fast memory exchange | Automatic and optimised coding | Necessitates an optimisation or manual coding | Necessitates an optimisation or manual coding |
| Allocation of registers | Automatic | automatic | automatic |
| Scheduling of instructions | Automatic | automatic | automatic |

- in the case of a scalar processor with a small cache memory and a large slow memory, the size of sub-objects is chosen to be able to carry out the processing of a sub-object using the cache memory as much as possible; it would be possible, for example, to take sub-objects corresponding to squares of 32×32 pixels or sub-objects of 1 pixel or sub-objects of 4 pixels (2*2) or of N1*2 pixels, notably in the case of an unprocessed image, of "raw" type,
- in the case of a vector signal processor, the size of sub-objects is chosen as equal to or multiple of, the size of a vector that the platform is capable of processing and storing, sub-objects corresponding to 64 horizontal pixels could be taken, for example.

Once this decomposition into sub-objects has been carried out, in one embodiment, specific operations can be assigned to the processors. At each time, a specific operation can be performed by no processor or by one or more processors. This choice depends, notably, on the platform's architecture, i.e. the type of processor and arrangement of the different processors. Also, dependent on this architecture is the transit of data, i.e. the elementary information and/or results from specific operations from one processor to the other. In this case, if the time between two successive launches of two sub-processing operations is called T, at a point in time t+k*T, wherein t is any point in time and k is any integer, the platform performs, on at least one sub-object j, the same operations as those performed at time t on at least one sub-object i, these specific operations being applied to elementary information and/or to results from specific operations having the same relative position in their respective sub-object(s). This means that all the sub-processing operations are identical, which generates a code of relatively small size since only one sub-processing operation needs to be written explicitly and is applied several times. T is the period of time between two successive launches of two sub-processing operations, but this value is not necessarily equal to the time required for full execution of a sub-processing operation. Indeed, a sub-processing operation can be launched before the previous one has been completed and this can, for example, save time.

This case is illustrated by FIG. 2 in which it can be seen that the sub-processing operation ST1 has not been completed at the time when the sub-processing operation ST2 starts. Furthermore, the sub-processing operation ST2 is still executing when the sub-processing operation ST3 is launched.

In one embodiment, the assignment of specific operations to processors and/or the choice of the time at which each specific operation is performed is determined by the platform's compiler using specific formatted data.

To optimise the algorithm to the maximum, it can be useful to render the processing operation to be performed as regular as possible. To do so, in one of the invention's embodiments, the method includes the step, in the case where the quantity of specific operations to be applied to each sub-object is not a multiple of the quantity of processors Q and/or the quantity of elementary information for the object to be processed is not a multiple of N, of adding specific operations without effect and/or null elementary information, such that the quantity of specific operations is a multiple of Q and that the quantity of elementary information is a multiple of N.

According to the invention, null elementary information means unused elementary information of any content, and/or elementary information obtained by replication of other elementary information and/or elementary information obtained by calculation.

In one embodiment, the sequence of generic operations applies to at least one set of elementary information, called logical block, and the generic formatted data also include second data, for generic operations involving at least two logical blocks, referring to the relative position and/or a relative scale, notably spatial or temporal, of logical blocks in relation to each other, and in which the elementary information and/or results from specific operations on which each specific operation must be applied depends on second data and in which, in the case where at least one relative position of logical blocks in relation to each other is not null, at least one specific operation involves, directly or indirectly, at least one elementary information of another sub-object. In this case, the position and relative scale between any two logical blocks can be calculated using the second data. The size of each corresponding physical block, as well as its scale and the absolute position of each of the physical block's elements, can be deduced from this.

In one embodiment of the invention, the generic operations include at least one generic position operation generating a logical block made up of the absolute position according to one of the object's dimensions, as well as a generic indirection operation, generating, from a first block, a second block by displacement and/or change of scale according to a third block or to a parameter.

In another embodiment, the generic operations include at least one elementary generic operation comprised in the group including: the addition of logical blocks and/or parameters, the subtraction of logical blocks and/or parameters, the calculation of the absolute value of the difference between logical blocks, the multiplication of logical blocks and/or parameters, the maximum out of at least two logical blocks and/or parameters, the minimum out of at least two logical blocks and/or parameters, the grouping and de-grouping of logical blocks, the calculation of a logical block by application of a parameter, corresponding to a correlation table, to a logical block, the conditional choice of a logical block out of at least two logical blocks and/or parameters, this choice being made as follows: if a>b, c is selected, otherwise d is selected, wherein a, b, c, and d are logical blocks and/or parameters, the bar chart for a logical block, the change of scale of a logical block according to a parameter and/or to a logical block, the relative displacement of a logical block according to a parameter and/or to a logical block, and an operation producing a block containing at least one coordinate.

The generic operations involving a logical block and a parameter, such as addition, can be translated in processing in the platform, and correspond, for example, when the generic operation concerns an addition, to adding each element or elementary information of the physical block processed, corresponding to the logical block, to the value for the parameter corresponding to the absolute position of the element or of the elementary information to be processed.

These operations by their very nature are relatively standard operations in image processing but also in the processing of other sorts of objects. However, when they are applied to logical blocks in combination with second data, these operations provide a solution to the problem posed. These operations act as a base for forming all the operations that can be implemented in a data processing algorithm.

Thus, in one embodiment, the generic operations include complex generic operations corresponding to groups of elementary generic operations used themselves. These groups notably include: the calculation of the median value of at least three logical blocks and/or parameters, which correspond to a group of generic operations made up of calculations of minimum and maximum, the multiplication/accumulation of logical blocks and/or of parameters, the convolution of a logical block with a parameter, which corresponds to a group of generic operations made up of multiplications and of additions with several relative positions, the addition combined with a maximum and a minimum, the calculation of a gradient, which corresponds to an absolute value of differences with two relative positions, the scalar product of a parameter made up of a vector and several logical blocks to produce a logical block, the calculation of a change of scale with interpolation which corresponds to a group of generic operations made up of scale changes and multiplications and additions with several relative positions, the combination of logical blocks, which corresponds to a group of generic operations made up of scale changes with several relative positions.

Some of the operations involve several logical blocks. It has been shown that, in this case, second data is provided relative to the positions of logical blocks implemented in relation to each other.

The relative positions and relative scales, notably spatial and/or temporal, can correspond to diverse concepts depending on the type of object. They are applied between any 2 blocks, whatever their type (in the case of an image as described above, a logical block can notably be unprocessed, red, green, 8 bits . . . ).

In the case where the object is a still image with square pixels, the absolute or relative position can correspond, in one embodiment, to 2 values (vertical and horizontal) and the absolute or relative scale to 2 values (vertical and horizontal); the pixels of the top line of an object can have as absolute positions (0;0) (0;1) (0;2) . . . , and the pixels of the n th line can have as absolute positions (n;0) (n;1) (n;2); in this case the relative positions can be coded in the following manner: (−1; 0) indicates at the top, (0;1) indicates on the right and (2; −2) indicates 2 pixels below and 2 on the left; a relative scale of (0.5;0.5) then corresponds to a half resolution in each direction.

More generally, a combination of relative displacement and relative scale can be coded using 2 functions f and g in the following manner: (f(x;y);g(x;y))) for each pixel of absolute position x,y. It should be noted that a rounding off rule is necessary in order to take, for example, the nearest pixel. Thus:

- a relative position above is coded with $f(x;y)=-1$ and $g(x;y)=0$
- a relative scale of 0.7 is coded with $f(x;y)=0.7*(x-x0)$ and $g(x;y)=0.7*(y-y0)$; x0 and y0 corresponding to the absolute invariant position;
- a distortion correction is coded with f and g corresponding to the distortion field
- a YUV 4:2:2 format change i.e. YYUv using separate Y, U and V brightness and chrominance information can use, to obtain Y1 Y2 xx xx Y3 Y4 xx xx . . . using Y1 Y2 Y3 Y4 . . . , the next functions $f(x;y)=(x-x0)*0.5$ if x even, and $(x+1-x0)*0.5$ if x-x0 odd and with $f(y)=y-y0$; x0 and y0 corresponding to a parameter relative to an absolute position;

The following non-exhaustive list provides other examples of embodiments with various different type of objects:

- in the case where the object is a still image with hexagonal pixels positioned by line, two successive lines being offset by a half-pixel, the absolute or relative position and the absolute or relative scale can correspond each to 2 values (vertical and horizontal); the pixels of the top line of an object can have as absolute positions (0;0) (0;1) (0;2) . . . , and the pixels of the n th line can have as absolute positions (n;0.5) (n;1.5) (n;2.5) . . . if the line is an odd line, and (n;0) (n;1) (n;2) . . . if the line is an even line; the relative position can correspond to 2 values (vertical and horizontal), for example (−0.5; 0.5) indicates at the top right, (0,1) indicates on the right and (−0.5; 1,5) indicates the pixel located to the right of the top right pixel; a relative scale of (0.5;0.5) then corresponds to a half resolution in each direction. Also, a combination of relative displacement and relative scale can be coded using 2 functions f and g in the following manner: (f(x;y);g(x;y))) for each pixel of absolute position x,y. It should be noted that a rounding off rule is necessary in order to take, for example, the nearest pixel.
- in the case where the object is a moving image with square pixels, the absolute or relative position can correspond to 3 values (vertical, horizontal and temporal), for example, (−1; 0;0) indicates a pixel located at the top in the same image, (0; 0; −1) indicates the pixel with the same position in the previous image and (2; −2, −1) indicates the pixel located 2 pixels below and 2 to the left in the previous image. Also, a combination of relative displacement and relative scale can be coded using 3 functions f, g, h in the following manner: (f(x;y;t); g(x;y;t)); h(x;y;t)) for each pixel of absolute position x,y at time t. It should be noted that a rounding off rule is necessary in order to take, for example, the nearest pixel.
- in the case where the object is a single-channel sound, the absolute or relative position can correspond to 1 value (temporal); for example (−1) indicates the previous time, and (2) indicates 2 times after; a function f(t) then permits coding of a displacement and relative scales. A rounding off rule being used to take the nearest time.
- in the case where the object is a multi-channel sound, the absolute or relative position can correspond to 2 values (temporal, channel); for example (−1, 0) indicates the previous time for the same channel, and (2,1) indicates 2 times after for the following channel, organised for example spatially in a cyclic manner. Also, a combination of relative displacement and relative scale can be coded using 2 functions f, g in the following manner: (f(t;c);g(t;c)) for each audio sample positioned at the time t for the channel c. It should be noted that a rounding off rule is necessary in order to take, for example, the nearest time and channel.
- in the case where the object is a simulation mesh, the absolute or relative position can correspond to n values, each corresponding to a spatial or temporal dimension according to the meshing's topology. Also, a combination of relative displacement and relative scale can be coded using n functions. It should be noted that a rounding off rule is necessary in order to take, for example, the nearest node and time.
- in the case where the object is a modulated signal, the absolute or relative position can correspond to n values, corresponding respectively to time, where applicable to the frequency channel (transmission or reception on several frequencies) and where applicable (several transmitters or receivers positioned spatially) to a spatial dimension. Also, a combination of relative displacement and relative scale can be coded using n functions, and a rounding off rule must be chosen.
- in the case where the object is a set of measurements, the absolute or relative position can correspond to n values, each corresponding to one of the object's dimensions which, depending on the case, may be of temporal, spatial, frequency, phase or other type. Also, a combination of relative displacement and relative scale can be coded using n functions, and a rounding off rule must be chosen.
- in the general case where the object is of dimension n, the absolute or relative position can correspond to n values each corresponding to one of the object's dimensions which, depending on the case, can be of temporal, spatial, frequency, phase or other type. Also, a combination of relative displacement and relative scale can be coded using n functions, and a rounding off rule must be chosen.

Certain specific operations produce results likely to be used subsequently for another sub-processing operation. It is therefore useful to determine these results and to group them together and to transmit them.

Thus, in one embodiment, the method comprises the step of determining, according to second data, a part of the results from specific operations required for the subsequent specific operations for another sub-processing operation.

In another embodiment, the method also comprises the step of grouping together into a memory the results from specific operations required for the subsequent specific operations for another sub-processing operation according to second data and/or the scrolling mode.

In a further embodiment, the specific operations are performed by calculation units chained according to at least one cyclic chaining, and the method also comprises the step of determining, according to second data for each specific operation, whether or not the results of said specific operation should be transmitted according to a cyclic chaining. The method also comprises, where applicable, the step of determining according to second data and to the scrolling mode, which cyclic chaining to use to transmit the results of said specific operation.

These different embodiments can be applied independently from each other, or in combination.

Preferably, the relative displacement and/or relative scale information for second data is used to determine the dimension(s) according to which there is a displacement and/or change of scale for a given generic operation. Thus, the cyclic chaining(s) to be applied for each specific operation from the specific operation sequence translated from the sequence of generic operations, can be determined. Preferably, said cyclic chaining also comprises at least one queue.

When several operations apply a null displacement, it is useless to inscribe the results from each specific operation in memory, and to re-read them for the following operation, these storage and re-reading operations would be a waste of time and have no particular benefit for the processing operation. Thus, in one embodiment, specific formatted data includes information concerning the grouping together of specific operations, this group consisting in the formation of packets of one or more specific operations destined to be executed without storing the results of each non-useful specific operation for another sub-processing operation.

In one embodiment all of the sequence's specific operations are grouped together.

In one embodiment, specific formatted data only comprises one set of embedded loops.

Furthermore, certain specific operations can be applied to operation results already used in another sub-processing operation. For example, when the sequence of specific operations contains a filter applying three lines from intermediary calculations, in the case of an image decomposed into sub-objects corresponding to lines: the filter operation applied to the first sub-object, i.e. the first line, also uses, for example, the second and third lines of the image. The second and third lines will also be used by this same filter operation when it will be applied to the second sub-object, and even to the third sub-object with regards the third line. In this case, it can be beneficial to store these lines of pixels in memory so as not to have to re-calculate them subsequently, which would be costly in terms of calculation.

In the case where several filters are used on different data, it can be useful to store other data in the memory in a similar manner.

Thus, in one embodiment, specific formatted data includes operations making it possible to store in the platform's memory at least a part of results from specific operations required for the subsequent specific operations for another sub-processing operation.

Furthermore, in one embodiment, the method comprises the step of grouping together and storing in memory the results from specific operations used during the sub-processing operation of another sub-object according to the relative position of said other sub-object with relation to said sub-object.

An embodiment example applying cyclic chaining with queue as described further down will now be described. In this example, the scrolling mode is such that N equals 5, the object is decomposed into 10*5 sub-objects, the 10 sub-objects disposed horizontally are processed one by one, then the 10 sub-objects located below are processed, and so forth. The queue used according to the horizontal dimension contains data from the previous iteration while the queue used vertically contains data from the 10 pervious iterations; the memory grouping of the results from specific operations therefore depends on the scrolling mode. The grouping together and storing in memory of results from specific operations used during the sub-processing of another sub-object is therefore dependent on the relative position of said other sub-object with relation to said sub-object.

The method also comprises, in certain cases, the step of grouping together in at least one queue the results from specific operations performed during the sub-processing of a sub-object and used during the sub-processing of another sub-object.

In one embodiment, wherein the calculation units are chained according to at least one cyclic chaining, whereby the chaining also comprises at least one queue.

In some cases, specific formatted data includes information concerning the transfer of results from specific operations and/or stored elementary information from one of the platform's memory slots to another. The fifth example of translation described further down contains such transfers.

In one embodiment, at least one specific operation can, however, be such that it has an edge effect, i.e. there is a loss of certain information located at the edge of the sub-objects on which these operations are applied. To avoid these edge effects, the image is decomposed into sub-objects which have an overlay, i.e. they have some elementary information in common. Thus, specific formatted data includes specific operations so that results from specific operations are calculated several times in the platform, such that no information is lost at the time of the execution of specific operations, notably in the case where the sub-objects are overlaid in at least one dimension. The fifth example of translation described further down contains such an overlay.

In one embodiment, specific formatted data contains addressing information to enable the platform to access at least a part of results from specific operations and/or stored elementary information, wherein this addressing information is in "base address+offset" or "(base address+offset) modulo (size of a buffer memory)" format, the offset being constant for the results from one same specific operation of from one sub-processing operation to the other. In one embodiment, the base address is modified for each sub-processing operation.

Preferably, the buffer memory is integrated into one of the processing platform's memories. Notably, the buffer memory can be a queue.

In one embodiment, the method comprises the step of calculating the offset according to the order of specific operations, in such a way as to provide the platform with addresses for memory slots that are empty or that contain a specific operation result or an elementary information which is no longer used, in order to store the results from specific operations. This calculation is performed accounting for the different parameters, notably of specific operations, so as not to erase from the memory information which will be used subsequently in another sub-processing operation or by another specific operation, as described above. Thus, with a simple address calculation, and re-using the memory, a cyclic buffer is obtained, enabling storage of the intermediary data necessary for subsequent calculations. Notably, in the case of an image where processing is carried out by line, the lines used on input of vertical filters are kept.

In one embodiment, the method also comprises the step of determining said offset according to the first data, the offset being different for each specific operation of the sequence of specific operations obtained by translation of the sequence of generic operations of the first data. For example, at least one queue is implemented with addressing information in "base address+offset", or "(base address+offset" modulo (the size of a buffer memory located in the platform) format: the second data is used to determine the queue to be used.

To apply the specific operations to sub-objects, it is generally beneficial to use loops in order to reduce the size of the code and to render it more uniform. Thus, in one embodiment, the processing operation includes the calculation of at least one loop, the quantity of iterations of the loop(s) and, when there are several loops, the embedding of loops, according to the scrolling mode. The following examples of translation show that it is possible to calculate automatically the loops according to the platform, contrary to known languages where the loops are coded manually according to the platform.

These loops can, for example, be used to scroll through the sub-objects, notably in the case where the object to be processed is an image decomposed into sub-objects of rectangular form, and where it is chosen to scroll through them either horizontally or vertically.

In the same manner, specific formatted data includes in certain cases temporary variables necessary for the processing operation.

Some specific operations use parameters, and, in this case, the values of these parameters are also processed. These parameters can for example be multiplying factors. These parameters can correspond, for example, without the list being restrictive, to:
    filter factors,
    saturation values,
    offset values, and
    correlation tables.

In one embodiment, the values of parameters used by the specific operations depend on the absolute position of sub-objects and/or the absolute position in the sub-objects of the elementary information applied, directly or indirectly, in these specific operations. For example, in the case where the object to be processed is an image, faults may appear on the image, due to the optic used to take the shot. These faults are not generally uniform throughout the whole image, notably on the edges. In this case, the same compensation factors will not be applied to all the image's pixels to compensate for this blur.

For example, the use of a parameter that is common to all the elementary information for a filter enables an increase in the sharpness in a uniform manner.

For example, the use of a parameter dependent on the absolute position of elementary information in the object to be processed, for a filter, increases the sharpness in a more significant manner at the edge in order to compensate for an optic fault.

For example, the use of a parameter dependent on the absolute position of elementary information in the object to be processed, for a vignetting correction generates a higher compensation at the edge in order to compensate for an optic fault.

For example, the use of a parameter dependent on the absolute position of elementary information in the object to be processed for a demosaicing operation permits the "red" pixels, "green" pixels and "blue" pixels in an unprocessed image received from a sensor to be processed differently.

For example, the use of second data, notably a displacement, dependent on the absolute position of elementary information in the object to be processed for a digital enlargement calculation ("zoom") or for a distortion correction calculation, generates the pixels required for calculating the interpolation at each point.

In one embodiment, the value of a parameter, depending on this parameter's type, can:

be constant and intrinsic to the algorithm; in this case the parameter's value can notably be transmitted to the processing means or to the platform, and/or
    depend on the object's source or destination: for example, in the case where the object to be processed is an image from a device fitted with a given optic, the parameter's value can depend on the type of optic which has an impact on the level of sharpness in the image; in this case, the parameter's value can, notably, be transmitted to the processing means or to the platform, and/or
    depend on the object to be processed: for example, in the case where the object to be processed is an image from a sensor, the parameter's value can depend on the gain of the sensor effectively used to capture said object which has an impact on the level of noise in the image; in this case, the parameter's value can notably be transmitted, selected or calculated by the platform, and/or
    depend on the absolute position of the elementary information in the object; in this case, the parameter's value can notably be transmitted, selected or calculated by the platform, and/or
    not depend on the absolute position of the elementary information in the object.

The parameter value can be determined simultaneously or a posteriori with relation to the definition of the algorithm.

Having seen that the value of certain parameters can vary from one object to another, from one sub-object to another, or from one elementary information to another. In this case, in one embodiment, the value of the parameter is calculated at each change.

In another embodiment, the possible values for the parameter are calculated a priori, and, at each change, the index or the address is determined enabling access to the parameter's value, for example in a table. In another embodiment, more specifically adapted to the parameters whereby the value varies from one sub-object to another according to the absolute position of the sub-object and whereby the number of values is limited, for example the parameters corresponding to the optic sharpness characteristics, a limited number of parameter value sets are determined, each set is stored and for each sub-object the set to be used is selected, for example by calculating a function of the position giving the address of the set to be used.

As aforementioned, the parameters are used during the application of certain specific operations. For this to be possible, in one embodiment, specific formatted data includes the value(s) of parameters and/or a calculation code for the value(s) of parameters.

In another embodiment, the value(s) of parameter(s) are chosen according to the processing platform, such that the processing operation accounts for the characteristics of this platform. Thus, an identical algorithm can be available for several platforms, and this algorithm is adapted to each required platform, only by varying these characteristics.

In another embodiment, these parameter values depend on the subject to be processed.

In one of the invention's embodiments, the specific operations comprise at least one specific calculation operation from the group comprising: addition, subtraction, multiplication, application of a correlation table, minimum, maximum and selection In one embodiment, at least one specific calculation operation also performs an offset, and/or a saturation and/or a rounding off. According to the invention, the specific selection calculation operation enables choosing data from at least two data items according to the value of the third data item In one embodiment, a correlation table is applied by a calculation using the table's input and a limited number of factors. In one embodiment, the limited number of factors is fixed at 8.

In one embodiment, the specific operations are performed by chained calculation units by means of at least one cyclic chaining CC1; said cyclic chaining CC1 also comprising at least one queue; at least one specific operation IS4 from the specific operation sequence transmitting the result of a specific operation IS5 performed on a calculation unit UC1 at the calculation unit UC2 or queue which follows said calculation unit UC1 according to said chaining.

In one embodiment the specific operation IS4 transmits, from the queue, to the calculation unit UC0 following the queue, the result of a specific operation IS5 performed during a previous sub-processing operation. Preferably the queue enables outputting data in the same order as they have been input in the queue. Preferably, a chaining comprising calculation units and a queue, includes a mechanism enabling management of the booting operation: the queue is initialised in a regular manner, for example at the beginning of each line, if the queue is part of a horizontal chaining and the object is an image; upon the first execution of the specific operation IS4, no data is transmitted to UC0 from the queue; next, the specific operation IS4 transmits, from the queue, to the calculation unit UC0 which follows the queue, the result of a specific operation IS5 performed during a previous sub-processing operation. In one embodiment, the sub-object comprises DSO dimensions, the specific operations are performed by calculation units chained according to a determined dimension DD of the sub-object by means of at least one cyclic chaining CC1; said cyclic chaining CC1 also comprising at least one queue; the method also comprises the step, for at least one specific operation, for each application of said specific operation
- of transmitting the result from said application of the specific operation performed on a calculation unit UC1 to the calculation unit UC2 or queue following said calculation unit UC1 according to said chaining
- of transmitting from the queue to the processing unit UC0 following the queue, in a conditional manner according to the position of the sub-object in the object, a result of the application of the specific operation transmitted to the queue during the processing of another sub-object.

In another embodiment, the specific operations comprise at least one geometric specific operation taken in the group comprising: transposition, replication, sub-sampling
The specific geometric operations enable notably:
- to sort data,
- to select data in order to perform calculations of scale change, sub-sampling or over-sampling
- to select data in order to delete useless data, notably on the edges.

According to the embodiments, the specific operations can be performed by calculation units chained according to at least one cyclic chaining; said cyclic chaining also comprising at least one queue.

In a further embodiment, the specific operations are performed by calculation units chained according to at least one cyclic chaining; said cyclic chaining also comprising at least one queue; the queue having a size and or a latency; the method also comprising the step of determining the size and/or the latency of the queue according to the sequence of generic operations and the scrolling mode.

Preferably, as described above, the queue comprises several data fluxes, and enables storage for each flux of an identical number NF of data. NF is determined according to the relative disposition of the sub-objects and to the scrolling mode, such that NF-1 sub-objects be processed between the processing of a sub-object producing data and the processing of the sub-object using the same data.

Preferably, the objects to be processed are images, and the elementary information are this image's pixels.

Thus, in one embodiment, the processing platform is part of an image capturing or rendering device, and the values of the parameters are linked to the characteristics of the optic and/or of the sensor and/or of the imager and/or of the electronics and/or of the software for the capturing and/or image rendering device. The characteristics can be, notably, intrinsic fixed characteristics for all the objects or variables according to the object, for example noise characteristics which vary according to a sensor's gain. The characteristics can also be identical for all the elementary or variable information according to the absolute position of the elementary information, for example the optic sharpness characteristics.

In another embodiment, the object to be processed is a digital audio signal, and, in this case, the elementary information consists in the audio samples for this signal. In this case, the relative positions present in the second data will generally be temporal positions. Nevertheless, these positions may happen to be spatial, notably in the case where the object to be processed is a sound present on several channels.

In another embodiment of the invention, notably in the case of digital simulation, the object to be processed is a numerical mesh and the elementary information is the spatial and/or temporal information characterising each point of the meshing.

The specific formatted data described here can be provided to a processing platform directly. But it can also be provided, in a known computer language, such as C or VHDL language, to a compiler destined to translate this computer language for the platform. This enables, for example, the use of an existing platform equipped with a compiler, without having to manage the assignment of registers or the scheduling of instructions.

The invention also relates to a system for processing generic formatted data, including first data describing a sequence of generic operations without any loops, the system providing, directly or indirectly, specific formatted data, for a determined platform comprising Q processor(s) and at least one memory, the platform being destined to process, according to specific formatted data, an object made up of elementary information of same type, each elementary information being represented by at least one numerical value, the system comprising:
- means for translating the sequence of generic operations into one sequence of specific operations, according to the platform,
- means for determining the set of loops necessary for the processing operation according to the platform's architecture and according to the object's topology, and independently of first data,
- means for calculating specific formatted data comprising the sequence of specific operations and the loops thus determined and enabling, directly or indirectly, the processing of the object conform with generic formatted data, in an optimised manner for the platform in terms of code size and/or memory size and/or calculation time.

In one embodiment, the system comprises:
- means for determining a mode for scrolling elementary information in the platform according to this platform's architecture and according to the object's topology and independently from first data, these means to determine this scrolling mode comprising means for choosing and/or calculating:

a group of elementary information in sub-objects, each comprising a quantity N of elementary information, multiple of Q, determined according to the platform, the processing in the platform consisting in launching periodically a sub-processing operation, which consists in applying the sequence of specific operations to one of the sub-objects, The form and overlay of sub-objects, determined according to the platform, the processing order for sub-objects, determined according to the platform.

and means for determining the set of loops necessary for the processing operation and/or for calculating the sequence of specific operations accounting for the scrolling mode.

In one embodiment, the system comprises means for determining which specific operations(s) of the sequence of specific operations is(are) performed by each processor, each specific operation being applied at least N times on each sub-object, each specific operation applying, directly and/or indirectly, at least once each, a sub-object's elementary information during its N applications and producing exactly N results; the method also comprising the step of adding the information thus determined to the specific formatted data.

In one embodiment, the system comprises means for determining, at each relative time of the period, which specific operations(s) of the sequence of specific operations is(are) performed by each processor, each specific operation being applied at least N times on each sub-object, each specific operation applying, directly and/or indirectly, at least once each, a sub-object's elementary information during its N applications and producing exactly N results; the method also comprising the step of adding the information thus determined to the specific formatted data.

In one embodiment, the system comprises means for, in the case where the quantity of specific operations to be applied to each sub-object is not a multiple of the quantity of processors Q and/or the quantity of elementary information for the object to be processed is not a multiple of N, adding specific operations without effect and/or null elementary information, such that the quantity of specific operations be a multiple of Q and the quantity of elementary information be a multiple of N.

In one embodiment, the system comprises:

means so that the sequence of generic operations is applied to at least one set of elementary information called logical block, means for receiving generic formatted data including second data, for generic operations involving at least two logical blocks, referring to the relative position and/or to the relative scale, notably spatial or temporal, of logical blocks in relation to each other, means so that the elementary information and/or results from specific operations on which each specific operation must be applied depend on second data and means wherein, in the case where at least one relative position of logical blocks in relation to each other is not null, at least one specific operation involves, directly and/or indirectly, at least one elementary information of another sub-object.

In one embodiment, the system comprises means for determining, according to second data, a part of results from specific operations required for the subsequent specific operations for another sub-processing operation.

In one embodiment, the system comprises a memory storing the grouped results from specific operations required for the subsequent specific operations for another sub-processing operation according to second data and/or the scrolling mode.

In one embodiment, the system comprises calculation units chained according to at least one cyclic chaining, and means for determining, according to second data for each specific operation, whether of not the results of said specific operation according to a cyclic chaining need to be transmitted. The system also comprises means for, where applicable, determining, according to second data and the scrolling mode, the cyclic chaining to be used to transmit the results of said specific operations.

In one embodiment, the system comprises means so that specific formatted data includes information concerning the grouping together of specific operations, this group consisting in the formation of packets of one or more specific operations destined to be executed without storing the results of each specific operation for another sub-processing operation.

In one embodiment, the system comprises means so that specific formatted data includes operations making it possible to store in the platform's memory at least a part of results from specific operations required for the subsequent specific operations for another sub-processing operation.

In one embodiment, the system comprises a memory storing the grouped results from specific operations for use during the sub-processing operation of another sub-object, according to the relative position of said other sub-object in relation to said sub-object.

In one embodiment, the system comprises at least one queue storing the grouped results from specific operations performed during the sub-processing operation of a sub-object and used during the sub-processing operation of another sub-object.

In one embodiment, the system comprises means so that specific formatted data includes specific operations so that results from specific operations be calculated several times in the platform, such that no information is lost at the time of execution of specific operations, notably in the case where the sub-objects are overlaid in at least one of the object's dimensions.

In one embodiment, the system comprises means so that specific formatted data contains addressing information enabling the platform to access at least a part of results from specific operations and/or stored elementary information, wherein addressing information is in "base address+offset" or "base address+modulo offset (the size of a buffer memory located in the platform)" format, the offset being constant for the results from one same specific operation.

In one embodiment, the system comprises means for modifying the base address for each sub-processing operation.

In one embodiment, the system comprises means for calculating the offset according to the order of specific operations, in such a way as to provide the platform with addresses for memory slots that are empty or that contain a specific operation result or an elementary information which is no longer used, in order to store the results from specific operations.

In one embodiment, the system comprises means for calculating at least one loop, the quantity of iterations of the loop(s) and, when there are several loops, the embedding of loops, according to the scrolling mode.

In one embodiment, the system also comprises means for processing at least one parameter, such that the value(s) of the parameter(s) used by the specific operations depend(s) on the position in the sub-objects of the elementary information applied, directly or indirectly, in these specific operations.

In one embodiment, the system also comprises means for processing at least one parameter, such that specific formatted data includes the value(s) of the parameter(s) and/or a calculation code for the value(s) of the parameter(s).

In one embodiment, the system also comprises means for processing at least one parameter, and comprises means for selecting the value(s) of parameter(s) according to the processing platform, such that the processing operation accounts for the characteristics of this platform.

In one embodiment, the system also comprises means for processing at least one parameter, such that the value(s) of the parameter(s) depend(s) on the object to be processed.

In one embodiment, the system comprises means for carrying out a specific operation comprised in the group including: addition, subtraction, multiplication, application of a correlation table, minimum, maximum, selection.

In one embodiment, the system comprises calculation units chained by means of at least one cyclic chaining CC1, said cyclic chaining CC1 also including at least one queue; the system including means for transferring the result of a specific operation IS5 performed on a calculation unit UC1s, to a calculation unit UC2 or queue following said calculation unit UC1 according to said chaining.

In one embodiment, the system comprises means for carrying out at least one specific geometric operation comprised in the group including: transposition, replication and sub-sampling.

In one embodiment, the system comprises calculation units chained by means of at least one cyclic chaining, the cyclic chaining including at least one queue.

In one embodiment, the system comprises chained calculation units according to at least one cyclic chaining, the cyclic chaining also including at least one queue, and the system including means for determining a size and/or a latency of the queue according to the sequence of generic operations and to the scrolling mode.

In one embodiment, the system comprises means so that the object to be processed is an image and so that the elementary information is the pixels of this image.

In one embodiment, the system comprises means so that the processing platform is part of a image capturing and/or rendering device, and so that the value(s) of the parameter(s) is(are) linked to the characteristics of the optic and/or of the sensor and/or of the imager and/or of the electronics and/or of the software for the image capturing and/or rendering device.

In one embodiment, the system comprises means so that the object to be processed is a digital audio signal and so that the elementary information is audio samples of this signal.

In one embodiment, the system comprises means so that the object to be processed is a numerical mesh and so that the elementary information of spatial and temporal information characterise each point of the meshing.

BRIEF DESCRIPTION OF THE SEVERAL VIEWS OF THE DRAWING(S)

Other characteristics and advantages of the invention will become apparent from the non-restrictive description of some of its embodiments, this description being supported by figures wherein:

FIGS. 1a, 1b, 1c 1d, 1$^e$ and if, already described, show examples of decomposition of an image into sub-objects, conform with the invention FIG. 2, already described, shows an example of sequencing of several sub-processing operations, FIG. 3 shows a device using a method conform with the invention, FIG. 4 shows an example of a sequence of generic operations applied to several logical blocks and to one parameter.

DETAILED DESCRIPTION OF THE INVENTION

Figure 3:
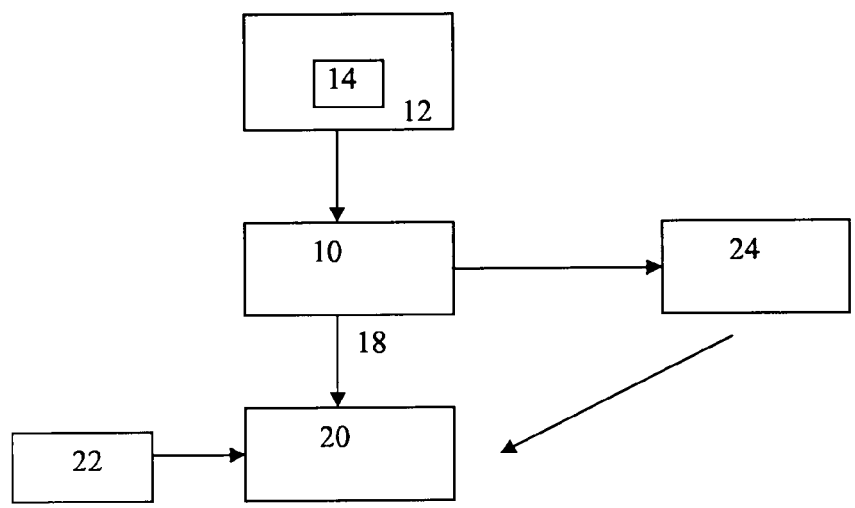

The device shown in FIG. 3 is destined to process an image 22, this image being a set of pixels represented by at least one numerical value.

In this device, a digital data processing means 10 is provided with generic formatted data 12. This processing means can for example be a compiler.

The generic formatted data, supplied by a method conform to the invention, includes first and second data 14 which describe sequences of generic operations and which give the relative positions of the logical blocks involved in these generic operations. This first and second data will be illustrated by the description in FIG. 4.

The processing means 10 also receives on input a scrolling mode 24 chosen or calculated according to the characteristics of a processing platform 20, such as an image capturing or rendering device.

Using this generic formatted data 12 and these parameters, the processing means 10 provides the processing platform 20 with specific formatted data 18.

The specific formatted data contains different types of data, such as data concerning the organisation of pixels in the platform's memory, the order in which the pixels are processed by the platform or even the grouping of specific operations performed by the platform.

The platform 20 then uses said specific formatted data 18 to process the image 22 that it receives on inbound.

FIG. 3 thus illustrates several advantages of the invention:
  the generic formatted data 12 can be modified or replaced rapidly and translated into specific formatted data 18 optimised for the platform. This would reduce the time taken for the market release of the platform.
  the generic formatted data 12 can be translated rapidly into specific formatted data optimised for several platforms. This would also reduce the time taken for the market release of several platforms.

Figure 4:
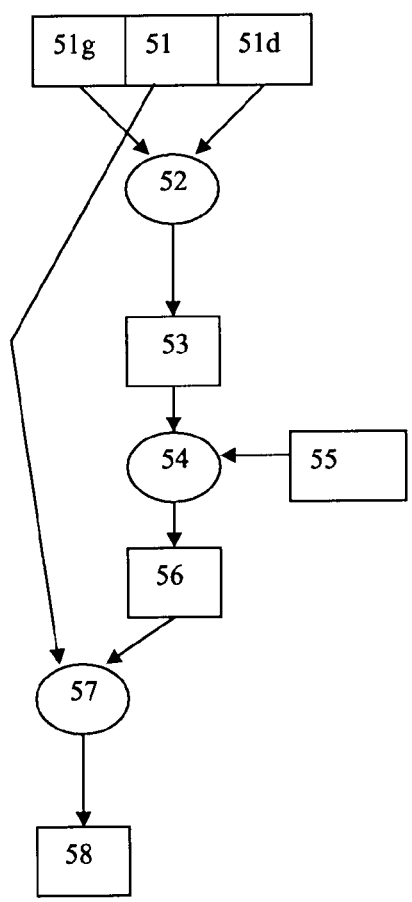

Table 4 below and FIG. 4 show an example of generic formatted data, in the form of a sequence of generic operations applied to a logical block B1. This sequence includes three generic operations. The table's columns show, in order:
  The operation's rank in the sequence,
  the name of the generic operation,
  the logical block (output) on which the result of the generic operation is inscribed, i.e. the location where this result would be, were the object reconstituted at the end of each operation,
  the first input (input 1) of the generic operation, which can be a logical block or a parameter,
  the relative position of the logical block to be used with relation to the logical block at input 1, if applicable,
  the second input (input 2) of the generic operation, which can also be a logical block or a parameter, and
  the relative position of the logical block to be used with relation to the logical block at input 2, if applicable, The information located in the "relative position" columns is the information present in the second data provided to a processing means using a method according to the invention. In this table, this information is found in the form of "left" and "right" for the purpose of simplicity, however in reality, in generic formatted data, it can also be coded by numerical values such as (0;1) and/or by functions such as f(x;y), as described in the embodiment examples above.

In one embodiment, a generic operation generates a logical block made up of the absolute position according to one of the object's dimensions, another generic operation called indirection generates a block by displacement and/or change of scale indicated by a second block from a third block. The calculations of functions giving the relative position and/or the relative scale can then be calculated, for example, 0.5*(x−100) using generic operations on the blocks, then using the generic indirection operation to perform the relative displacement and/or the corresponding relative change of scale. Table 4 is only an example of coding, the first data and second data can be coded in diverse ways in tabulated format, but also in symbol format, in graph format or in any other format. Furthermore, additional information relative to data types, to offsets and to saturations are not shown in the example for the purpose of simplification.

TABLE IV

| Sequence | Operation | Output | Input 1 | Relative position input 1 block | Input 2 | Relative position input 2 block |
|---|---|---|---|---|---|---|
| 1 | Addition | B2 | B1 | Left | B1 | Right |
| 2 | Table | B3 | Param 1 | | B2 | |
| 3 | Multiplication | B4 | B3 | | B1 | |

The first logical block used in this sequence of operations is a logical block B1 (51). The first generic operation is an addition (52) between the logical block B1 offset to the left (51g), and logical block B1 offset to the right (51d). The result of this addition is recorded in block B2 (53): B2=B1left+B1right.

The second operation (54) is a transformation of block B2 (53) with relation to a table. This operation therefore has block B2 (53) in input and a parameter Param1 (55) which represents the modification table. The result of this operation is recorded in block B3 (56): B3=LUT (Param1, B2).

The third and final operation (57) in this sequence is a multiplication of logical blocks. This operation has logical block B3 (56) and logical block B1 (51): B4=B3*B1 for inputs.

Logical block B4 (58) is thus the block obtained at the end of the sequence of generic operations.

The generic formatted data in the example in table 1 is independent from the platform, from the object's decomposition into sub-objects, from the scrolling mode of the object's elementary information, from the order in which the elementary information will be processed in the platform, as well as from the stored organisation. Indeed, the generic formatted data in table 1 can be translated in diverse manners into specific formatted data or into code for the platform, for example, without the list being restrictive, according to the following translations.

A first example of translation, although not optimal in terms of memory and calculation time, illustrates a simple translation without involving decomposition into sub-objects:

For each of the input object's pixels BP1 (corresponding to logical block B1) excluding the two left-hand and right-hand columns, the pixels being scrolled through from left to right then from top to bottom:

Add together the pixel on the left of the current pixel and the pixel on the right, store the result in a physical block BP2 (corresponding to logical block B2).

For each pixel of BP2 scrolled through from left to right then from top to bottom:

apply the table to the current pixel, and store the result in a physical block BP3 (corresponding to logical block B3)

For each pixel of BP3 scrolled through from left to right then from top to bottom:

Multiply the current pixel by the corresponding pixel of BP1, and store the result in the physical output block BP4 (corresponding to logical block B4).

A second example of translation shows that the size and memory used can be reduced without changing generic formatted data. Indeed, in the first example, 4 physical blocks of a size akin to the image are used. Only 2 physical blocks can be used using the same memory for BP2, BP3 and BP4. The following translation is obtained:

For each of the input object's pixels BP1 (corresponding to logical block B1) excluding the two left-hand and right-hand columns, the pixels being scrolled through from left to right then from top to bottom:

Add together the pixel on the left of the current pixel and the pixel on the right, store the result in a physical block BP2 (corresponding to logical block B2).

For each pixel of BP2 scrolled through from left to right then from top to bottom:

apply the table to the current pixel, and store the result in a physical block BP2 (now corresponding to logical block B3)

For each pixel of BP2 scrolled through from left to right then from top to bottom:

Multiply the current pixel by the corresponding BP1 pixel and store the result in the physical output block BP2 (now corresponding to logical block B4).

A third example of translation shows that the calculation time can be reduced without changing generic formatted data. Indeed, in the second example, 2 physical blocks of size akin to the image are used, but the physical block BP2 is written 3 times in full, the physical block BP1 is read 2 times in full and the physical block BP2 is read 2 times in full. This can be limited to only one reading and one writing, with a different scrolling mode and different blocks. This reduces the number of operations required, but also reduces memory access requirements. The following translation is obtained:

For each of the input object's pixels BP1 (corresponding to logical block B1) excluding the two left-hand and right-hand columns, the pixels being scrolled through from left to right then from top to bottom:

Perform the following specific operation sequence: Add together the pixel on the left of the current pixel and the pixel on the right, apply the table to the result and multiply the table output by the current pixel, store the result in the current physical output block BP2 (corresponding to logical block 24)

In a fourth example, more specifically adapted to a scalar processor with cache, the result is written in the same memory zone as the input. This reduces the memory size even further and renders memory access local, which is very beneficial in the case of a cache memory or a paged memory. Thus, the following translation is obtained:

For each of the input object's pixels BP1 (corresponding to logical block B1) excluding the two left-hand and right-hand columns, the pixels being scrolled through from left to right then from top to bottom:

Perform the following specific operation sequence:

Add together the pixel on the left of the current pixel and the pixel on the right, apply the table to the result and multiply the table output by the current pixel, store the result in the current physical output block BP1 in place of the pixel on the left of the current pixel (the left pixel is no longer used contrary to the current pixel which will become the left pixel for the next iteration; BP1 corresponds partially to logical block B4 and partially to logical block B1)

A fifth example of translation is specifically adapted to a signal processing processor with a small quick-access memory and a large slow memory, each sub-object being a rectangle for example 32×32 or any other value maximising the use of the quick-access memory, the rectangles being adjoined. Thus, the following translation is obtained:

For each sub-object, the sub-objects being scrolled from left to right then from top to bottom:

Launch a transfer via a DMA ("direct memory access") mechanism of the next physical input block from the slow memory to the quick-access memory, corresponding to the next sub-object extended by one additional column to the left and one to the right, making 32×34

Launch a transfer via a DMA ("direct memory access") mechanism of the previous physical output block from the quick-access memory to the slow memory.

The physical block is taken, corresponding to the current sub-object extended by an additional column to the left and to the right, making 32×34, and obtained at the end of the DMA of the previous iteration For each pixel of the physical input block (corresponding to logical block B1) excluding the two columns on the left and right scrolled through from left to right then from top to bottom:

Perform the following specific operation sequence: Add together the pixel on the left of the current pixel and the pixel on the right, apply the table to the result and multiply the table output by the current pixel, store the result in the current physical output block (corresponding to logical block B4)

A sixth example of translation is specifically adapted to a vector signal processor capable of applying one same calculation to the different pixels of the vector, each sub-object being a rectangle, for example 64 horizontal pixels or any other value equal to the size of a vector that the platform is capable of processing and storing. This translation does not require any memory since vectors are processed one at a time. Thus, the following translation is obtained:

For each sub-object V1 of the input object BP1 (corresponding to logical block B1) excluding the two columns on the left, the sub-objects being scrolled through from left to right then from top to bottom, perform the following specific operation sequence:

At the start of each line create a vector V0 containing on the right, the line's 2 left-hand pixels Extract from V0 and V1, the vector V2 corresponding to the two right-hand pixels of V0 and to the two left-hand pixels of V1, excluding the 2 right-hand pixels of V0;

Add together V1 and V2 to obtain V2, apply the table to each pixel of V2 to obtain V2, Extract from V0 and V1, the vector V3 corresponding to the right-hand pixel of V0; copy V1 in V0 for the following iteration; multiply V2 by V3 to obtain V2, store the result V2 in the current output physical block.

The above examples of translations show that it is possible, using the same generic formatted data, to translate in a number of ways with memory structures, loops and a degree of parallelism adapted to very diverse platforms. Particularly:

the size of the code can be reduced using only one single loop, and/or the size of the memory can be reduced, to 0 in the example, but in the more general case where there are vertical filters, some memory lines are required to prevent having to repeat calculations for the input data of vertical filters, and/or the number of operations required can be reduced, notably by grouping the loops, and/or any size of vector can be adapted to, and/or any memory architecture can be adapted to.

The third, fourth, fifth and sixth examples are example of translation of the sequence of generic operations into one sequence of specific operations.

For the purpose of simplification, the examples produce a smaller image than the input image. If necessary, an output image of identical size to the input image can be obtained easily, by adding code at the beginning and end of each line to duplicate the edge pixel.

Figure 5:
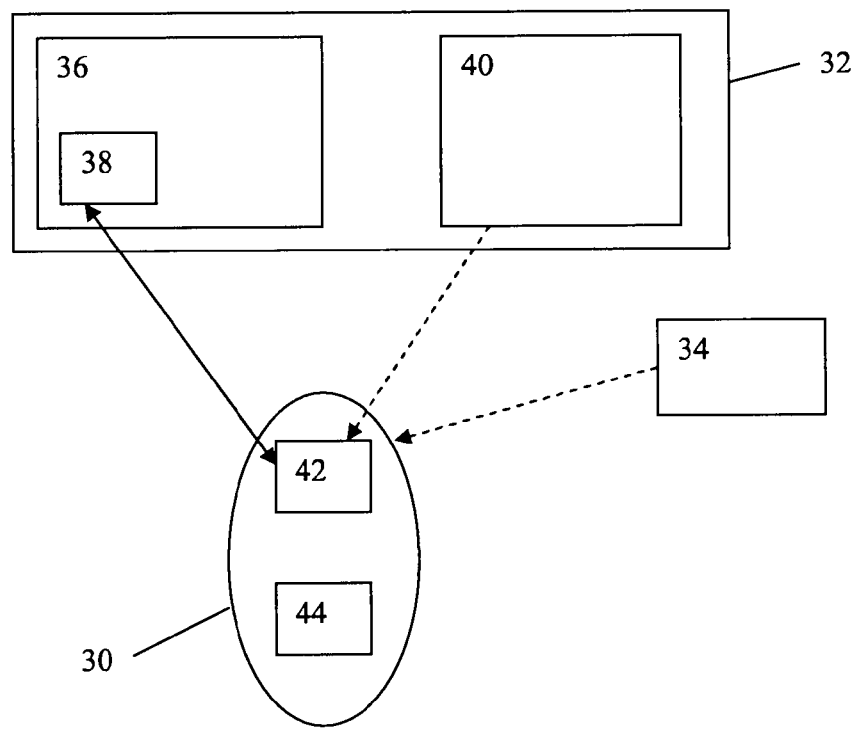
FIG. 5 shows the structure of specific formatted data provided by a method conform with the invention.

FIG. 5 shows the structure of specific formatted data at the output of a processing means using a method conform with the invention. The specific formatted data is calculated by a processing means using generic formatted data 32 provided to the processing means and using a scrolling mode 34 determined by this processing means. The generic formatted data includes first data 36 containing data 38 describing at least one generic operation or sequence of operations to be performed by the processing means. The generic formatted data also includes second data 40 referring to the position and relative scale of logical blocks in relation to each other, for generic operations involving at least two logical blocks. Using this generic formatted data and the scrolling mode 34, the processing means provides data 42 relative to the specific operations, and data 44 relative to the loops. This data 42 and 44 is part of the specific formatted data 30.

Several examples of scrolling modes that can be determined by a method conform with the invention will now be described. Each of these scrolling modes is destined to be used in a platform, the architecture of which is shown in one of FIGS. 6 to 8.

Figure 6:
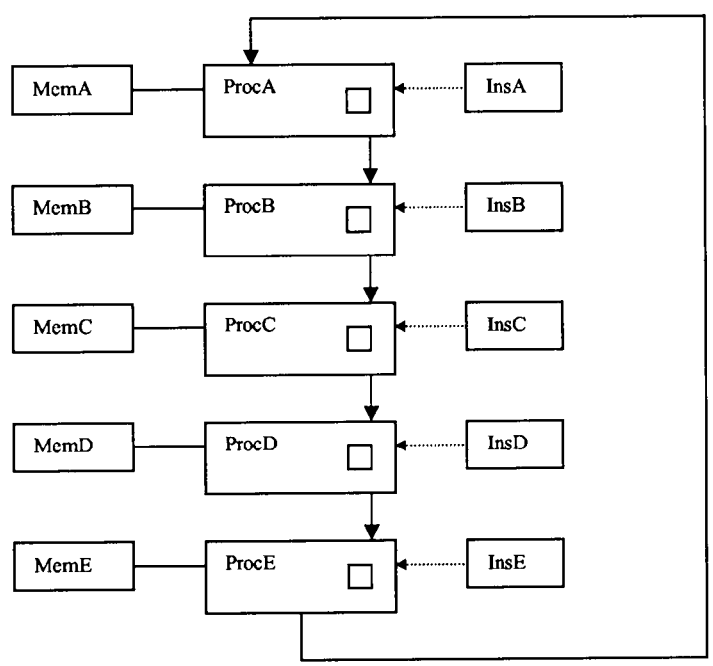
FIGS. 6, 7 and 8 show different architectures of platforms that can receive specific formatted data provided by a method conform with the invention.

In a first example, illustrated by FIG. 6, the processing platform comprises five processors chained in one dimension. This means that the result of calculations output from the processor Proc A is used in input for processor ProcB, and so forth. The result of calculations output by processor ProcE is applied to the input of processor ProcA.

Each processor is equipped with a memory of limited capacity, noted MemA to MemE. This memory unit is destined for storing parameter values that are used for specific operations performed by the processor, or elementary information or results from operations which are destined to be re-used quickly by the processor.

In this first example, the processing operation consists in applying a sequence of eight operations noted OP1 to OP8 to the elementary information composing the object.

In order to processed, the object must be decomposed into sub-objects of N elementary information. N, which must be a multiple of Q (Q=5, quantity of calculation units), is determined upstream of the platform by a method conform with the invention, notably according to the platform's memory capacity. In the example, N=5.

Furthermore, in order to perform regular sequencing of specific operations, a method conform with the invention creates specific operations without effect OP9 and OP10 such that the quantity of specific operations to be performed on each sub-object be a multiple of the quantity of available processors.

According to the specific type of operations, each operation is assigned to be performed by a processor. Here,
processor A performs OP1 and OP6,
processor B performs OP2 and OP7,
processor C performs OP3 and OP8,
processor D performs OP4 and OP9, and
processor E performs OP5 and OP10.

Each processor executes a set of instructions (InsA to InsE) corresponding to the specific operations with which it has been assigned. The values of the parameters stored in the memories with limited capacity also depend on this assignment. For example, if OP1 is a multiplication by 2, the MemA memory will contain the FIG. 2.

Once these assignments have been made, the operations take place according to a sequencing schedule described by table I below:

In this table, the process advance times are noted T1, T2, . . . T13.

At time T5, it is shown that each processor performs an operation on one of sub-object 1's information.

When a processor has performed a specific operation on all of a sub-object's elementary information, it proceeds to its next assigned operation. Thus, the ProcA processor performs, from T6, the operation OP6.

Once a processor has performed all its assigned specific operations, the following sub-object is processed. Two different sub-objects (sub-object 1 and sub-object 2) are therefore processed at the same time in the platform.

In this table, it is shown clearly that each specific operation is performed N times (here N=5).

This sequencing is obtained by cyclic chaining in one of the processors' dimensions. The elementary information can therefore transit from one calculation unit to the other. For example, the elementary information IE1 goes via all the processors to "undergo" specific operations OP1 to OP5, then returns to the ProcA processor to start a cycle again and "undergo" operations OP6 to OP7. (N.b. as explained above, the initial elementary information IE1 will not necessarily be the IE1 information in all the steps). It can thus be seen that the invention enables generation of specific formatted data adapted to a systolic architecture which has the advantage, notably, of storing the values of parameters locally and of being able to cable the data paths. It can be noted that the exact sequencing can be performed at least partially by a compiler

TABLE I

| | IE1 | IE2 | IE3 | IE4 | IE5 | |
|---|---|---|---|---|---|---|
| OP1 | T1 - ProcA | T2 - ProcA | T3 - ProcA | T4 - ProcA | T5 - ProcA | |
| OP2 | T2 - ProcB | T3 - ProcB | T4 - ProcB | T5 - ProcB | T6 - ProcB | |
| OP3 | T3 - ProcC | T4 - ProcC | T5 - ProcC | T6 - ProcC | T7 - ProcC | Sub-object 1 |
| OP4 | T4 - ProcD | T5 - ProcD | T6 - ProcD | T7 - ProcD | T8 - ProcD | |
| OP5 | T5 - ProcE | T6 - ProcE | T7 - ProcE | T8 - ProcE | T9 - ProcE | |
| OP6 | T6 - ProcA | T7 - ProcA | T8 - ProcA | T9 - ProcA | T10 - ProcA | |
| OP7 | T7 - ProcB | T8 - ProcB | T9 - ProcB | T10 - ProcB | T11 - ProcB | |
| OP8 | T8 - ProcC | T9 - ProcC | T10 - ProcC | T11 - ProcC | T12 - ProcC | Sub-object 2 |
| OP9 | T9 - ProcD | T10 - ProcD | T11 - ProcD | T12 - ProcD | T13 - ProcD | |
| OP10 | T10 - ProcE | T11 - ProcE | T12 - ProcE | T13 - ProcE | T14 - ProcE | |

Each line represents one of 10 specific operations OP1 to OP10. Each column represents one of the elementary information IE1 to IE5, each composing the sub-objects to be processed. This IE1 to IE5 notation is formal; it does not necessarily correspond to a spatial or temporal reality. Indeed, certain specific operations generate a displacement of the elementary information. Thus, the information IE1 processed by the specific operation OP2 may not be the result of the specific operation OP1 applied to the information IE1, but the result of this specific operation OP1 applied to the information IE2, for example, if the specific operation OP1 consists in an offset towards the left.

Each box in this table contains the name of the processor which performs the specific operation, as well as the time when this specific operation is performed during the processing operation. Evidently, this table only represents a part of the processing operation. Here, it is assumed that all the results from required specific operations have already been calculated in the processing operation.

Thus, it is shown that at time T1, the ProcA processor performs the operation OP1 on the first information IE1 of the sub-object 1. At this point in time, the other processors are performing other operations that are not shown in this table.

on the platform. In this case, specific formatted data does not contain the absolute sequencing in time, but rather the restrictions on the sequencing.

Figure 7:
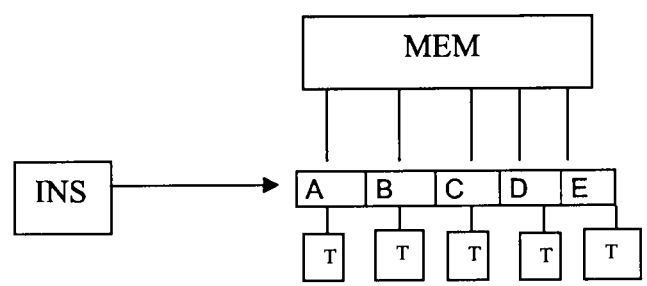

In a second example, illustrated in FIG. 7, the platform contains five processors linked to a common memory. Such a structure is classic: it corresponds to that of a vector signal processor (of "Single Instruction Multiple Data" or SIMD type).

In the example, each processor is linked individually to a small memory capable of containing parameters such as a correlation table T. In this structure, each processor performs all the specific operations. Thus, all the processors receive the same set of instructions INS.

In this second example, the case is considered where one of the operations consists in using a table to modify one or more elementary information. As seen above, each processor has access to its own table, all tables being identical. In one alternative, each memory is shared by a group of processors. In one alternative, the set of processors share the same memory and obtain the same parameter simultaneously; in this case, a correlation table must be applied, carried out by calculation using one or more parameters for example to calculate a polynome.

This involves a parallel operation: at each of the process' times, all the processors perform the same operation on different elementary information. This process is illustrated by table II below:

In this table, the process advance times are noted T1, T2, . . . T10.

TABLE II

|      | IE1          | IE2          | IE3          | IE4          | IE5          |
|------|--------------|--------------|--------------|--------------|--------------|
| OP1  | T1 - ProcA   | T1 - ProcB   | T1 - ProcC   | T1 - ProcD   | T1 - ProcE   |
| OP2  | T2 - ProcA   | T2 - ProcB   | T2 - ProcC   | T2 - ProcD   | T2 - ProcE   |
| OP3  | T3 - ProcA   | T3 - ProcB   | T3 - ProcC   | T3 - ProcD   | T3 - ProcE   |
| OP4  | T4 - ProcA   | T4 - ProcB   | T4 - ProcC   | T4 - ProcD   | T4 - ProcE   |
| OP5  | T5 - ProcA   | T5 - ProcB   | T5 - ProcC   | T5 - ProcD   | T5 - ProcE   |
| OP6  | T6 - ProcA   | T6 - ProcB   | T6 - ProcC   | T6 - ProcD   | T6 - ProcE   |
| OP7  | T7 - ProcA   | T7 - ProcB   | T8 - ProcC   | T7 - ProcD   | T7 - ProcE   |
| OP8  | T8 - ProcA   | T8 - ProcB   | T8 - ProcC   | T8 - ProcD   | T8 - ProcE   |
| OP9  | T9 - ProcA   | T9 - ProcB   | T9 - ProcC   | T9 - ProcD   | T9 - ProcE   |
| OP10 | T10 - ProcA  | T10 - ProcB  | T10 - ProcC  | T10 - ProcD  | T10 - ProcE  |

In this table, it can be seen that at a given time T1, the specific operation OPi is performed by each of the processors ProcA to ProcE respectively on the elementary information IE1 to IE5.

After the 10th increment, it can be noted that each specific operation in the sequence of specific operations has been performed on each of a sub-object's elementary information.

In this case, it appears not to be necessary to complete the sequence of specific operations with operations without effect, since the specific operations are performed in parallel by all the processors. In this manner, once the operation OP8 is complete, the process can be repeated by applying operation OP1 to the elementary information constituting the following sub-object.

It can be noted that the exact sequencing can be performed, at least partially by a compiler on the platform. In this case, the specific formatted data does not contain the absolute sequencing in time, but rather the restrictions on the sequencing.

Figure 8:
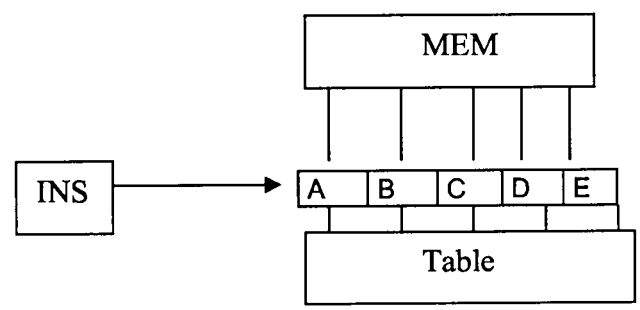

In a third example, illustrated by FIG. 8, the platform comprises a vector signal processor made up of five processors linked to a common memory, similar to the vector signal processor notably present in a computer of PC type. They are also all linked to a small memory which can contain parameters, and notably a correlation table. In this structure, each processor performs all the specific operations. Thus, all the processors receive the same set of INS instructions comprising data describing all the specific operations to be performed.

In this example, the case where a sequence of two specific operations consists in using a table to modify one or more elementary information is considered. Here, the tables are only present in one single location and the processors must therefore share them.

At the beginning of the process, a parallel operation is being carried out, since all the processors perform one same operation at the same time on the different elementary information of a sub-object. This process is illustrated by the table III below:

In this table, the process advance times are noted T1, T2, . . . T18.

TABLE III

|      | IE1         | IE2         | IE3         | IE4         | IE5         |
|------|-------------|-------------|-------------|-------------|-------------|
| OP1  | T1 - ProcA  | T1 - ProcB  | T1 - ProcC  | T1 - ProcD  | T1 - ProcE  |
| OP2  | T2 - ProcA  | T2 - ProcB  | T2 - ProcC  | T2 - ProcD  | T2 - ProcE  |
| OP3  | T3 - ProcA  | T3 - ProcB  | T3 - ProcC  | T3 - ProcD  | T3 - ProcE  |
| OP4  | T4 - ProcA  | T5 - ProcB  | T6 - ProcC  | T7 - ProcD  | T8 - ProcE  |
| OP5  | T9 - ProcA  | T10 - ProcB | T11 - ProcC | T12 - ProcD | T13 - ProcE |
| OP6  | T10 - ProcA | T11 - ProcB | T12 - ProcC | T13 - ProcD | T14 - ProcE |
| OP7  | T11 - ProcA | T12 - ProcB | T13 - ProcC | T14 - ProcD | T15 - ProcE |
| OP8  | T12 - ProcA | T13 - ProcB | T14 - ProcC | T15 - ProcD | T16 - ProcE |
| OP9  | T13 - ProcA | T14 - ProcB | T15 - ProcC | T16 - ProcD | T17 - ProcE |
| OP10 | T14 - ProcA | T15 - ProcB | T16 - ProcC | T17 - ProcD | T18 - ProcE |

In the first three lines of this table, it can be seen that at a given time Ti, the specific operation OPi is performed by each of processors ProcA to Proc E respectively on the elementary information IE1 to IE5.

When operation OP4 is reached, which uses a table, an access problem is encountered, since all the processors cannot access this table simultaneously. The processors are therefore obliged to "await their turn", i.e. to wait until the previous processor has finished using the table to be able to use it itself. Thus, the operation OP4 is performed by processors ProcA to ProcE respectively at times T4 to T8. Assuming that the operation OP5 also uses a table, in the same manner the following situation will arise: operation OP5 is performed by processors ProcA to ProcE respectively at times T9 to T13.

Once these operations have been performed, the process can continue as normal.

In this device, the results obtained are less efficient in terms of calculation time than in the other examples, since at certain times, certain processors are inactive, however the memory size is reduced.

It can be noted that the exact sequencing can be performed, at least partially by a compiler on the platform. In this case, the specific formatted data does not contain the absolute sequencing in time, but rather the restrictions on the sequencing.

Figure 9A:
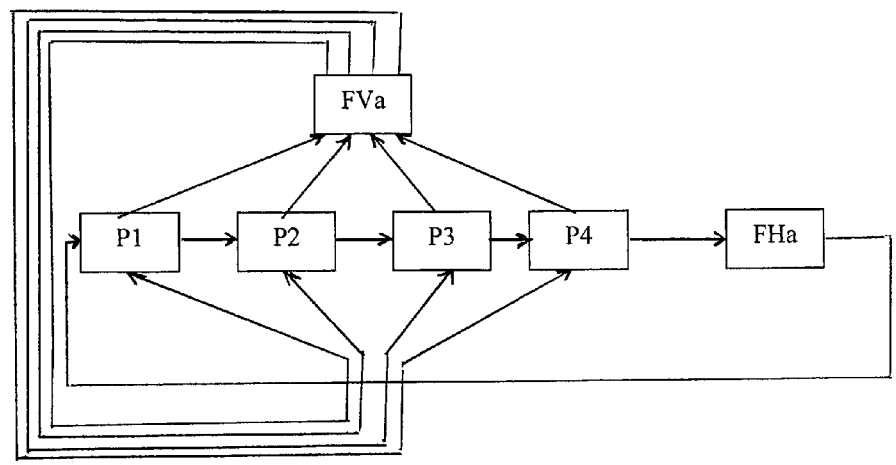
FIGS. 9a, 9b and 9c show examples of chaining of processors in a platform that can receive specific formatted data provided by a method conform with the invention.

FIG. 9a shows an embodiment example of a platform, comprising several cyclic chainings according to one of the sub-object's dimensions. In this first example, the object is an image with two dimensions, the sub-object comprises 4 elementary information, and the platform comprises 4 processors disposed according to a grid of 4*1 processors corresponding to a rectangle of 4 processors horizontally and 1 processor vertically. The processors are called up from left to right: P1, P2, P3, and P4. The method also applies 2 queues in this example:

a horizontal queue FHa is connected on input to an output of P4 and on output to an input of processor P1. An output of P1 is connected to an input of P2. An output of P2 is connected to an input of P3, and an output of P3 is connected to an input of P4.

a vertical queue FVa is connected on input to an output of P1, P2, P3 and P4 and on output to an input of processor P1, P2, P3 and P4.

The sequence of specific operations can apply an arbitrary quantity of horizontal filters FH while using the 4 processors at 100%. For example, in the case of a specific operation OS2 performing the calculation of a filter made up of an addition between the result of a specific operation OS1 and the result of the same specific operation OS1 on the left: the result of operation OS1 from processor P4 is placed in queue FHa and will be used by OS2 on P1 during the calculation of a subsequent sub-object; the result of operation OS1 from processor P3 is transferred to processor P4 to be used by OS2 on P4 in combination with the result of OS1 on P4; the result of the operation OS1 from processor P2 is transferred to processor P3 to be used by OS2 on P3 in combination with the result of OS1 on P3; the result of the operation OS1 from processor P1 is transferred to processor P2 to be used by OS2 on P2 in combination with the result of OS1 on P2; the result of the operation OS1 performed by P4 during a calculation of a previous sub-object is output from queue FHa and transferred to processor P1 to be used by OS2 on P1 in combination with the result of OS1 on P1; Another specific operation OS3 for the sequence can apply another horizontal filter, the queue is used to retrieve the data in the correct order.

Mutatis mutandis, the sequence of specific operations can apply an arbitrary quantity of vertical filters FV while using the 4 processors at 100%, Lastly, the sequence of specific operations can apply an arbitrary quantity of filters that are non-separable according to both horizontal and vertical dimensions FVH while using the 4 processors at 100%; for example, a non-separable 3×3 filter applied to 4 results from one specific operation OS4, can prompt FVa twice then FHa six times, to obtain the 8 sets of 4 OS4 results previously calculated to be combined with the set of OS4 results from the current sub-object; for example, these non-separable filters can be used in combination with vertical and/or horizontal filters, the 2 queues allowing data to be retrieved in the correct order.

When 2 filters are applied, the sequence of specific operations is therefore such that at least two specific operations distinct from the sequence each produce at least once during their N applications, a result used for the processing of another sub-object. The result used for the processing of another sub-object transits via the queue(s).

Figure 9B:
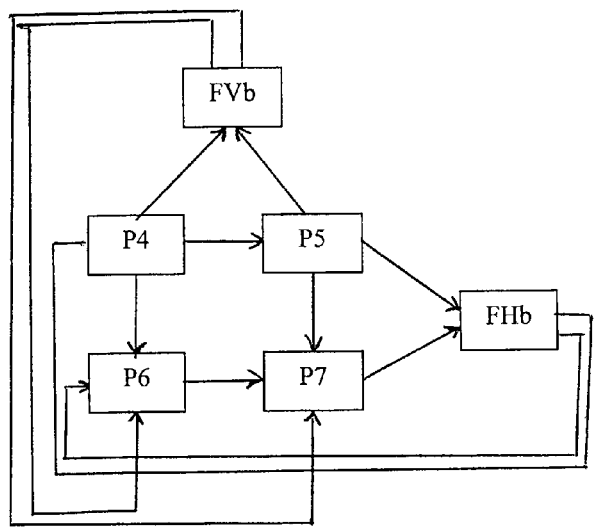

In the same manner, FIG. 9b shows a second example, wherein the object is an image with two dimensions, the sub-object comprises 4 elementary information, and the platform comprises 4 processors disposed according to a grid of 2*2 processors corresponding to a rectangle of 2 processors horizontally and 2 processors vertically. The processors are called up from left to right: P4 and P5 on the top line and P6 and P7 on the bottom line. The method also uses 2 queues, in this example:

a horizontal queue FHb is connected on input to the output of P3 and of P6 and in output to the input of P1 and P4
a vertical queue FVb is connected on input to an output of P4 and P5 and on output to an input of the P6 and P7 processor.

Also in the example of FIG. 9a, the sequence of specific operations can apply an arbitrary quantity of vertical and/or horizontal and/or non-separable filters while using the 4 processors at 100%.

Figure 9C:
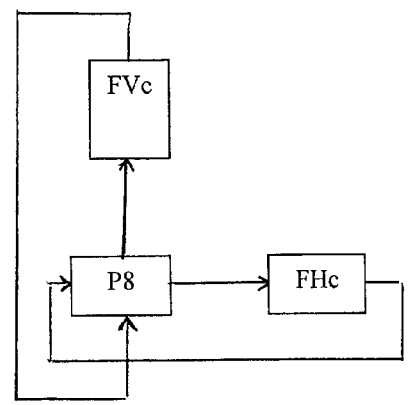

In a third example, illustrated in FIG. 9c, the platform comprises a single processor P8, connected to a horizontal queue FHc and to a vertical queue FVc. These two queues can be used by the processor to store results from specific operations destined to be re-used subsequently.

Also in the example in FIG. 9a, the sequence of specific operations can apply an arbitrary quantity of vertical and/or horizontal and/or non-separable filters while using the processor at 100%.

The invention claimed is:

1. A method for processing generic formatted data, including first data describing a sequence of generic operations without any loops, in view of providing directly or indirectly specific formatted data, for a determined platform comprising Q processor(s) and at least one memory, Q being a positive integer, the platform configured to process, according to the specific formatted data, an object made up of elementary information of one type, each elementary information being represented by at least one numerical value; the method comprising:

translating the sequence of generic operations into a sequence of specific operations, according to the platform, wherein the sequence of generic operations is applied to at least one set of elementary information of a logical block;

determining a set of loops necessary for the processing operation according to the platform's architecture and according to the object's topology, and independently from first data; and calculating, with a processor, specific formatted data comprising the sequence of specific operations and the determined loops and enabling, directly or indirectly, the processing of the object conform with generic formatted data, in an optimized manner for the platform in terms of code size and/or memory size and/or calculation time, wherein the generic formatted data further comprises second data, for generic operations involving at least two logical blocks, referring to the relative position and/or a relative scale, spatial and/or temporal, of logical blocks in relation to each other, the elementary information and/or results from specific operations on which each specific operation is to be applied depends on second data, and, in a case that at least one relative position of logical blocks in relation to each other is not null, at least one specific operation applies, directly or indirectly, at least one elementary information of another sub-object.

2. A method according to claim 1, the method further comprising:

determining a scrolling mode for elementary information in the platform, according to the architecture of the platform and according to the topology of the object and independently from first data, the determining the scrolling mode comprising a choice and/or calculation:

of a grouping of elementary information into sub-objects, each including a quantity N of elementary information, determined according to the platform, N being a positive integer, the processing in the platform launching periodically a sub-processing operation, which applies the sequence of specific operations to one of the sub-objects, of a form and overlay of the sub-objects, determined according to the platform, of a processing order for sub-objects, determined according to the platform, the determining the set of loops necessary for the processing operation and/or the calculating the sequence of specific operations accounting for the scrolling mode.

3. A method according to claim 2, wherein the determining a scrolling mode comprises determining which specific operation(s) of the sequence of specific operations is(are) performed by each processor, each specific operation being applied at least N times on each sub-object, each specific operation applying, directly and/or indirectly, at least once each, a sub-object's elementary information during its N applications and producing exactly N results; the method further comprising adding the information thus determined to the specific formatted data.

4. A method according to claim 2, wherein the determining a scrolling mode comprises determining at each of the period's relative times, which specific operation(s) of the sequence of specific operations is(are) performed by each processor, each specific operation being applied at least N times on each sub-object, each specific operation applying, directly and indirectly, at least once each, a sub-object's elementary information during its N applications and producing exactly N results; the method further comprising adding the information thus determined to the specific formatted data.

5. A method according to claim 2, wherein specific formatted data comprises specific operations making it possible to keep in the platform's memory at least a part of results from specific operations required for the subsequent specific operations for another sub-processing operation.

6. A method according to claim 2, further comprising grouping together and storing in memory the results from specific operations used during the sub-processing of another sub-object according to the relative position of the other sub-object in relation to the sub-object.

7. A method according to claim 2, wherein specific formatted data comprises specific operations so that results from specific operations are calculated plural times in the platform, such that no information is lost at the time of execution of specific operations, or in a case that the sub-objects are overlaid in at least one of the object's dimensions.

8. A method according to claim 2, wherein specific formatted data including addressing information to enable the platform to access at least a part of results from specific operations and/or stored elementary information, the addressing information being in "base address+offset" or "(base address+offset) modulo (the size of a buffer memory located in the platform)" format, the offset being constant for the results from one same specific operation for each sub-processing operation.

9. A method according to claim 2, wherein the processing comprises calculating at least one loop, a quantity of iterations for the loop(s) and, when there are plural loops, embedding of the loops, according to the scrolling mode.

10. A method according to claim 2, further processing at least one parameter, and wherein value(s) of the parameter(s) used by the specific operations depend(s) on the absolute position of sub-objects and/or the absolute position in sub-objects of the elementary information applied, directly or indirectly, in the specific operations.

11. A method according to claim 2, wherein the specific operations are performed by calculation units chained according to at least one cyclic chaining; the cyclic chaining further comprising at least one queue; the queue having a size and/or a latency; the method further comprising determining size and/or latency of the queue according to the sequence of generic operations and the scrolling mode.

12. A method according to claim 1, further comprising determining according to second data a part of results from specific operations required for subsequent specific operations for another sub-processing operation.

13. A method according to claim 12, further comprising grouping together into a memory the results from specific operations required for the subsequent specific operations for another sub-processing operation according to second data and/or the scrolling mode.

14. A method according to claim 13, wherein the specific operations are performed by calculation units chained according to at least one cyclic chaining, the method further comprising determining, according to second data for each specific operation, whether or not the results of said specific operation should be transmitted according to a cyclic chaining; the method further comprising, where applicable, determining according to second data and to the scrolling mode, which cyclic chaining to use to transmit the results of the specific operation.

15. A method according to claim 1, further processing at least one parameter, and wherein
 specific formatted data include the value(s) of the parameter(s) and/or a calculation code for the value(s) of the parameter(s), and/or
 the parameter(s) value(s) is(are) chosen according to the processing platform, such that the processing operation accounts for the characteristics of this platform, and/or
 the value(s) of parameter(s) depend(s) on the object to be processed, and/or
 in case the processing platform is part of an image capturing and/or rendering device and wherein the parameter(s) value(s) is(are) linked to the characteristics of the optic and/or of the sensor and/or of the imager and/or of the electronics and/or of the software for the image capturing and/or image rendering device.

16. A method according to claim 1, wherein the specific operations are performed by calculation units chained by at least one cyclic chaining; the cyclic chaining further comprising at least one queue; at least one specific operation from the specific operation sequence transmitting the result of one specific operation performed on a calculation unit to the calculation unit or queue which follows the calculation unit according to the chaining.

17. A method according to claim 1, wherein the specific operations comprise at least one specific calculation operation taken in the group comprising: addition, subtraction, multiplication, application of a correlation table, minimum, maximum, section, and/or at least one specific geometric operation taken in the group comprising: transposition, replication, sub-sampling.

18. A method according to claim 1, wherein the specific operations are performed by calculation units chained according to at least one cyclic chaining; the cyclic chaining further comprising at least one queue.

19. A method according to claim 1, wherein the object to be processed is comprised in the group comprising an image, a digital audio signal, and a numerical mesh, and the elementary information is respectively comprised in the group comprising pixels of the image, audio samples of the signal, and spatial and/or temporal information characterizing each point of meshing.

20. A system for processing generic formatted data, including first data describing a sequence of generic operations without any loops, the system providing, directly or indirectly, specific formatted data, for a determined platform comprising Q processor(s) and at least one memory, Q being a positive integer, the platform configured to process, according to the specific formatted data, an object made up of elementary information of one type, each elementary information being represented by at least one numerical value, the system comprising:
 means for translating the sequence of generic operations into a sequence of specific operations, according to the platform, wherein the sequence of generic operations is applied to at least one set of elementary information of a logical block;

means for determining a set of loops necessary for the processing operation according to the platform's architecture and according to the object's topology, and independently from first data; and means for calculating specific formatted data comprising the sequence of specific operations and the determined loops and enabling, directly or indirectly, the processing of the object conform with generic formatted data, in an optimized manner for the platform in terms of code size and/or memory size and/or calculation time, wherein the generic formatted data further comprises second data, for generic operations involving at least two logical blocks, referring to the relative position and/or a relative scale, spatial and/or temporal, of logical blocks in relation to each other, the elementary information and/or results from specific operations on which each specific operation is to be applied depends on second data, and, in a case that at least one relative position of logical blocks in relation to each other is not null, at least one specific operation applies, directly or indirectly, at least one elementary information of another sub-object.

* * * * *